(12) United States Patent
Iwano et al.

(10) Patent No.: US 11,501,464 B2
(45) Date of Patent: Nov. 15, 2022

(54) IMAGING APPARATUS, MOVEABLE BODY, AND IMAGING METHOD

(71) Applicant: KYOCERA Corporation, Kyoto (JP)

(72) Inventors: Shota Iwano, Sagamihara (JP); Katsumi Tsuji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 65 days.

(21) Appl. No.: 16/977,746

(22) PCT Filed: Mar. 18, 2019

(86) PCT No.: PCT/JP2019/011269
§ 371 (c)(1),
(2) Date: Sep. 2, 2020

(87) PCT Pub. No.: WO2019/188521
PCT Pub. Date: Oct. 3, 2019

(65) Prior Publication Data
US 2021/0056727 A1 Feb. 25, 2021

(30) Foreign Application Priority Data

Mar. 28, 2018 (JP) .............................. JP2018-062998

(51) Int. Cl.
G09G 5/00 (2006.01)
G06T 7/80 (2017.01)
(Continued)

(52) U.S. Cl.
CPC ................. G06T 7/80 (2017.01); B60R 1/00 (2013.01); G02B 27/32 (2013.01); G06T 11/00 (2013.01);
(Continued)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS

| 2010/0082281 A1* | 4/2010 | Nakamura ................ G06T 7/80 702/95 |
| 2013/0215280 A1* | 8/2013 | Maekawa ............ H04N 17/004 348/187 |
| 2020/0177866 A1* | 6/2020 | Myokan .................... G06T 7/80 |

FOREIGN PATENT DOCUMENTS

| JP | 2000-209577 A | 7/2000 |
| JP | 2011-185753 A | 9/2011 |
| JP | 2013-173453 A | 9/2013 |

* cited by examiner

Primary Examiner — Gordon G Liu
(74) Attorney, Agent, or Firm — Studebaker & Brackett PC

(57) ABSTRACT

An imaging apparatus comprises a camera and a controller. The camera generates a captured image. The controller superimposes a calibration object movable by translation or rotation in the captured image. In the case where a plurality of indexes I located at positions determined with respect to a moveable body having the camera mounted therein are subjected to imaging, the controller moves the calibration object so that a first corresponding portion coincides with an image of a first index of the plurality of indexes, and performs distortion correction on an area in the captured image determined based on a position of the image of the first index and a position of an image of a second index in the captured image and a position at which the calibration object is superimposed so that the image of the second index coincides with a second corresponding portion.

5 Claims, 18 Drawing Sheets

(51) Int. Cl.
 *B60R 1/00* (2022.01)
 *G02B 27/32* (2006.01)
 *G06T 11/00* (2006.01)
 *H04N 5/225* (2006.01)

(52) U.S. Cl.
 CPC ...... *H04N 5/2253* (2013.01); *B60R 2300/101* (2013.01); *B60R 2300/304* (2013.01); *G06T 2207/30252* (2013.01)

(58) Field of Classification Search
 USPC ........................................................ 345/633
 See application file for complete search history.

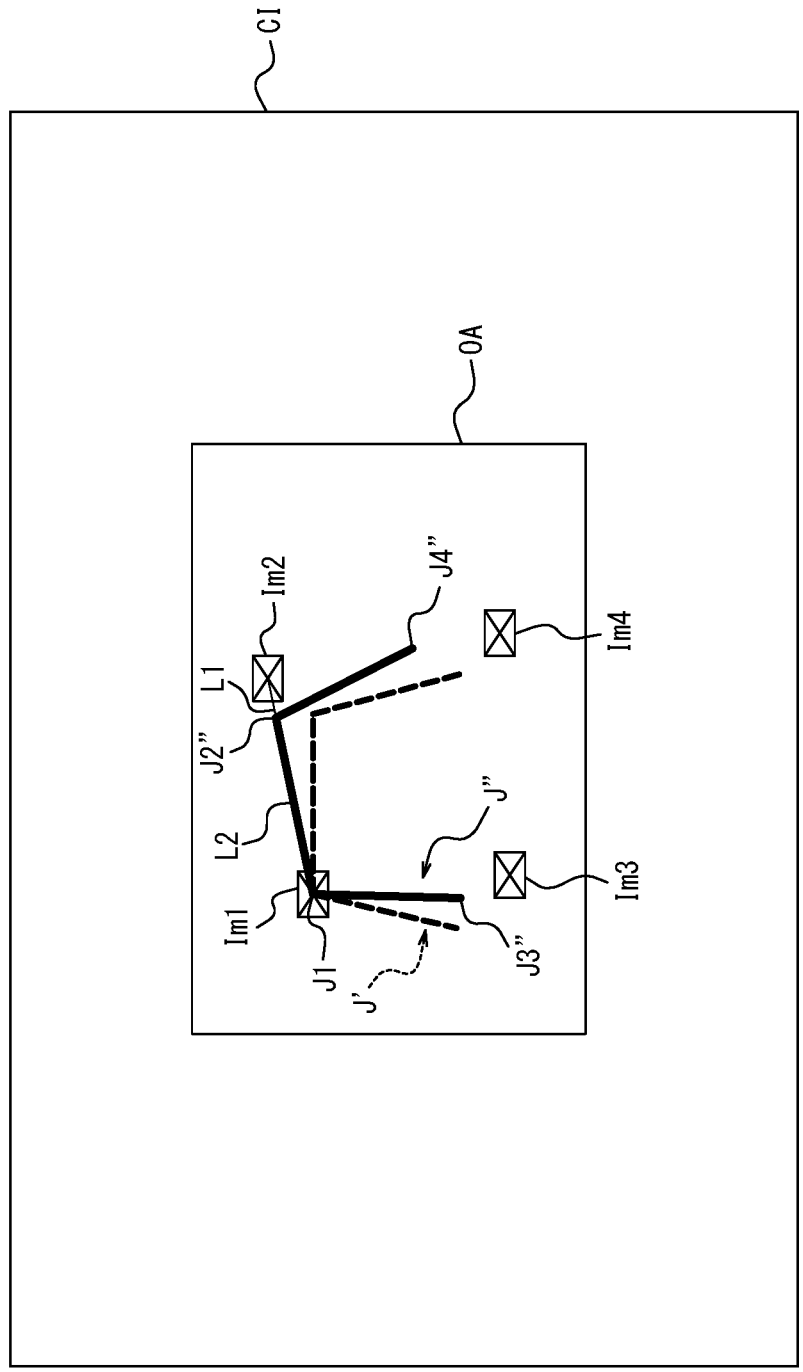

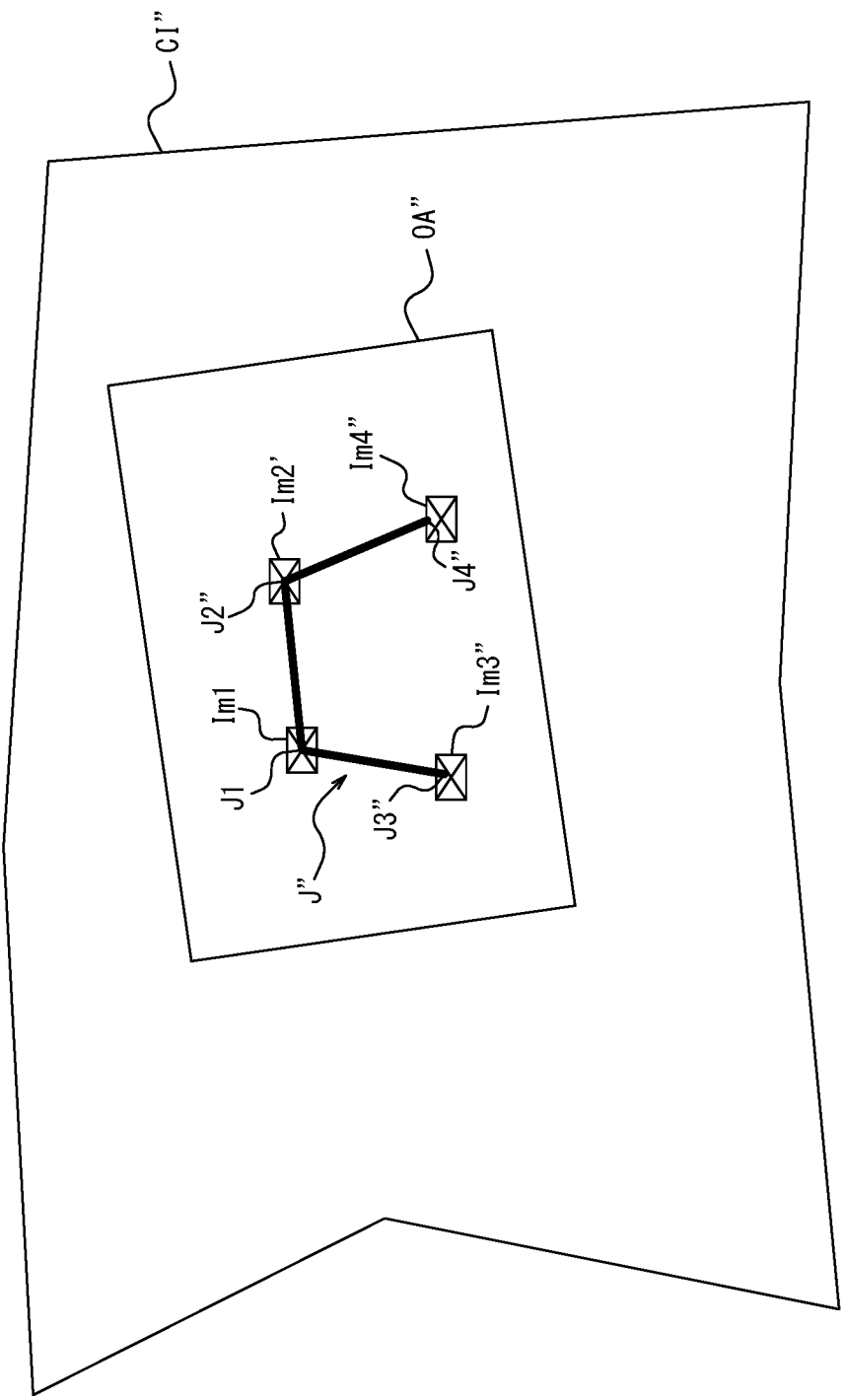

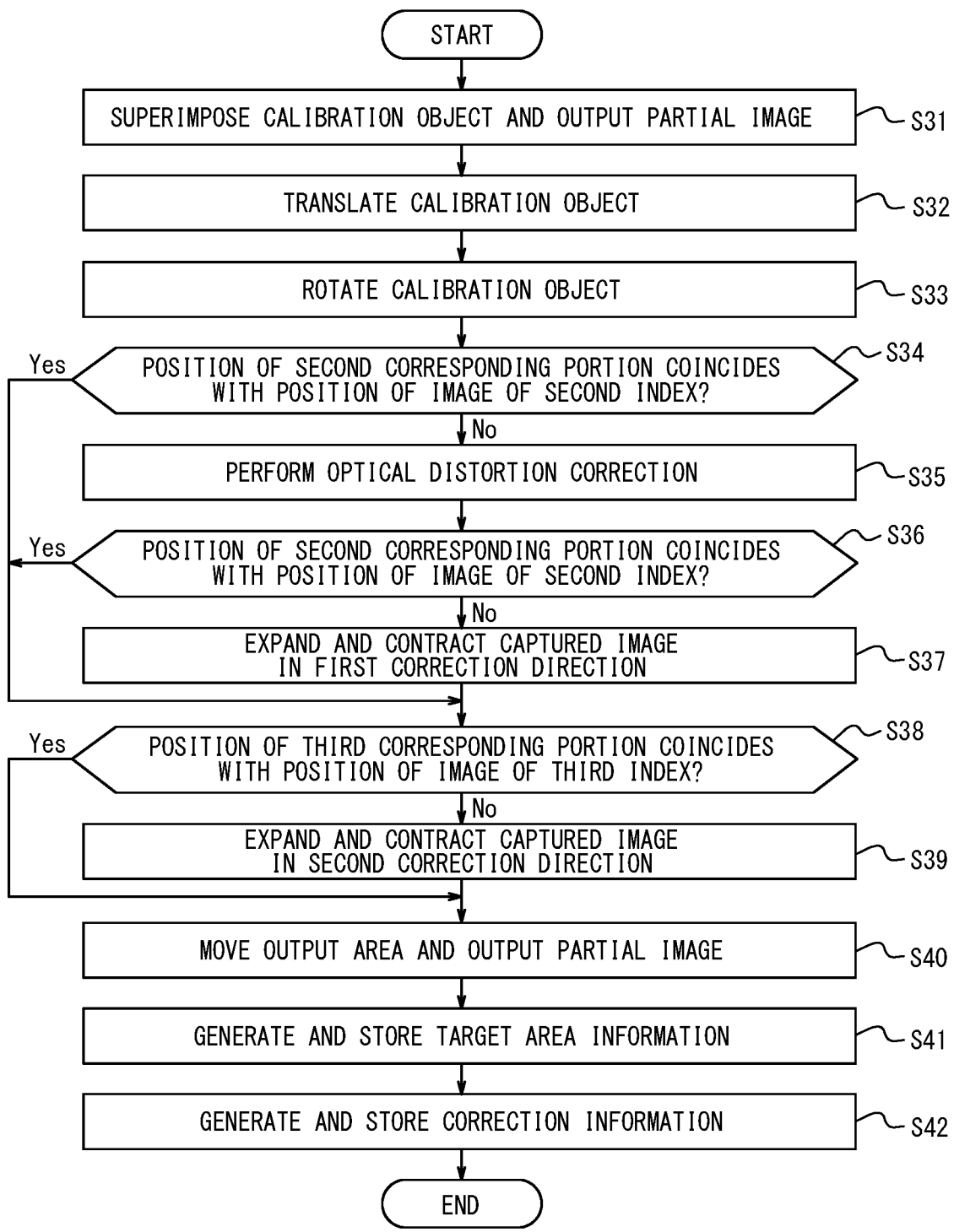

IMAGING APPARATUS, MOVEABLE BODY, AND IMAGING METHOD

CROSS REFERENCE TO RELATED APPLICATION

This application claims priority to and the benefit of Japanese Patent Application No. 2018-062998 filed on Mar. 28, 2018, the entire disclosure of which is incorporated herein by reference.

TECHNICAL FIELD

The present disclosure relates to an imaging apparatus, a moveable body, and an imaging method.

BACKGROUND

It is conventionally known to correct deviation of an image caused by deviation of the installation position or posture of a camera. For example, a technique of changing an area of a captured image, which is generated by imaging a subject as an index by a camera, so as to make an image of the index in the captured image coincide with a calibration object is proposed (for example, see JP 2000-209577 A (PTL 1)).

CITATION LIST

Patent Literature

PTL 1: JP 2000-209577 A

SUMMARY

An imaging apparatus according to one of the disclosed embodiment comprises a camera and a controller. The camera is configured to generate a captured image. The controller is configured to superimpose a calibration object movable by translation or rotation in the captured image, and, in a case where a plurality of indexes located at positions determined with respect to a moveable body comprising the camera mounted therein are subjected to imaging, move the calibration object so that a first corresponding portion of the calibration object superimposed on the captured image coincides with an image of a first index of the plurality of indexes included in the captured image, and perform distortion correction on an area in the captured image determined based on a position of the image of the first index and a position of an image of a second index other than the first index in the captured image and a position at which the calibration object is superimposed on the captured image so that the image of the second index coincides with a second corresponding portion of the calibration object.

A moveable body according to one of the disclosed embodiments comprises an imaging apparatus. The imaging apparatus includes a camera and a controller. The camera is configured to generate a captured image. The controller is configured to superimpose a calibration object movable by translation or rotation in the captured image, and, in a case where a plurality of indexes located at positions determined with respect to a moveable body comprising the camera mounted therein are subjected to imaging, move the calibration object so that a first corresponding portion of the calibration object superimposed on the captured image coincides with an image of a first index of the plurality of indexes included in the captured image, and perform distortion correction on an area in the captured image determined based on a position of the image of the first index and a position of an image of a second index other than the first index in the captured image and a position at which the calibration object is superimposed on the captured image so that the image of the second index coincides with a second corresponding portion of the calibration object.

An imaging method according to one of the disclosed embodiments is executed by an imaging apparatus. The imaging apparatus generates a captured image. The imaging apparatus superimposes a calibration object movable by translation or rotation in the captured image. The imaging apparatus, in a case where a plurality of indexes located at positions determined with respect to a moveable body comprising a camera generating the captured image mounted therein are subjected to imaging, moves the calibration object so that a first corresponding portion of the calibration object superimposed on the captured image coincides with an image of a first index of the plurality of indexes included in the captured image, and performs distortion correction on an area in the captured image determined based on a position of the image of the first index and a position of an image of a second index other than the first index in the captured image and a position at which the calibration object is superimposed on the captured image so that the image of the second index coincides with a second corresponding portion of the calibration object.

BRIEF DESCRIPTION OF THE DRAWINGS

In the accompanying drawings:

FIG. 16 is a schematic diagram illustrating a state in which the calibration object in the captured image illustrated in FIG. 15 is moved by rotation;

FIG. 17 is a schematic diagram illustrating a state in which the captured image illustrated in FIG. 16 is subjected to optical distortion correction and tilt distortion correction; and FIG. 18 is a flowchart illustrating a calibration process by the imaging apparatus illustrated in FIG. 14.

DETAILED DESCRIPTION

Even when an area of a captured image generated by imaging a subject as an index by a camera is changed so as to make an image of the index in the captured image coincide with a calibration object as in the conventional technique, the image of the index cannot be made to coincide with the calibration object in some cases, making it difficult to correct deviation of the image with high accuracy.

It could be helpful to provide an imaging apparatus, a moveable body, and an imaging method that can correct deviation of an image caused by deviation of the installation position or posture of a camera with high accuracy.

An imaging apparatus 10 according to Embodiment 1 of the present disclosure will be described below, with reference to drawings.

Figure 1:
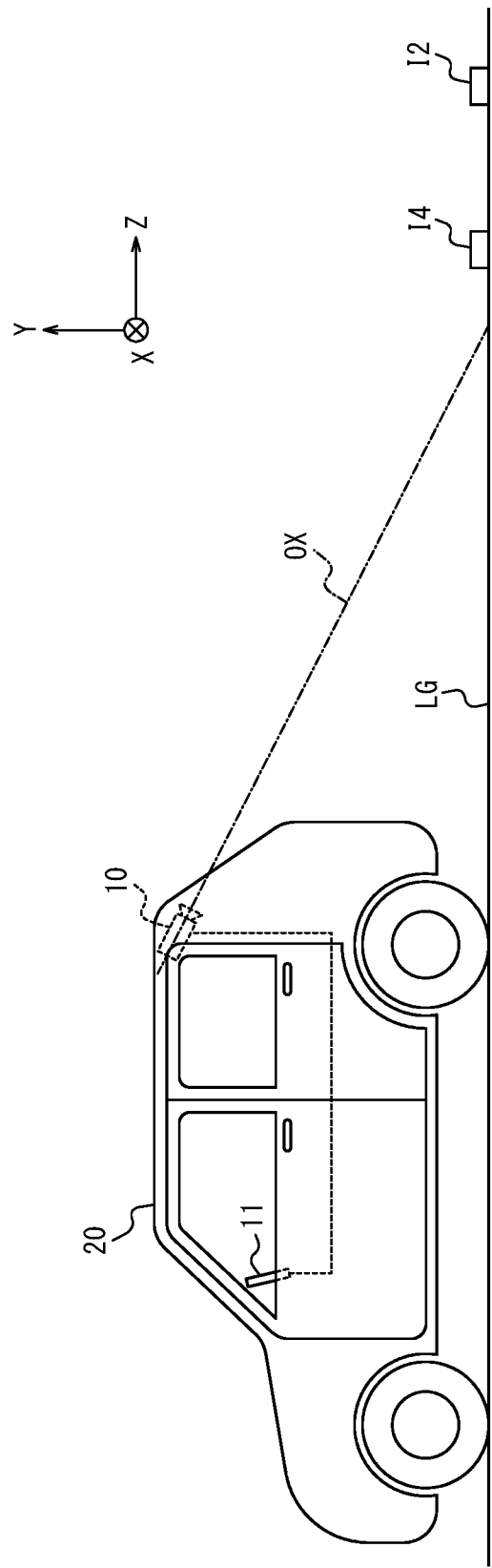
FIG. 1 is a schematic diagram illustrating a moveable body including an imaging apparatus according to Embodiment 1 and a display apparatus.

As illustrated in FIG. 1, the imaging apparatus 10 according to one of the disclosed embodiments is mounted in a moveable body 20 so as to be capable of imaging, for example, a sight (rear sight) behind the moveable body 20. In the following description, the vertically upward direction is referred to as direction Y, the rearward direction of the moveable body 20 is referred to as direction Z, and the direction perpendicular to direction Y and direction Z is referred to as direction X. Imaging is not limited to a sight behind the moveable body 20, and the imaging apparatus 10 may be installed in the moveable body 20 so as to be capable of imaging a sight in front of or lateral to the moveable body 20. For example, the imaging apparatus 10 is mounted in the moveable body 20 so as to be capable of imaging the road surface near the moveable body 20. Thus, the imaging apparatus 10 may be mounted so that, for example, the optical axis OX forms an angle of 30° to 60° with the level ground LG. A display apparatus 11 for displaying images is installed in the moveable body 20. The imaging apparatus 10 is connected to the display apparatus 11 via a communication network, and transmits images to the display apparatus 11.

The moveable body 20 may be, for example, a vehicle, a ship, or an aircraft. Vehicles may include, for example, motor vehicles, industrial vehicles, railed vehicles, domestic vehicles, and fixed-wing airplanes running on runways. Motor vehicles may include, for example, cars, trucks, buses, two-wheeled vehicles, and trolleybuses. Industrial vehicles may include, for example, industrial vehicles for agriculture and construction. Industrial vehicles may include, for example, forklifts and golf carts. Industrial vehicles for agriculture may include, for example, tractors, cultivators, transplanters, binders, combines, and lawn mowers. Industrial vehicles for construction may include, for example, bulldozers, scrapers, power shovels, crane trucks, dump trucks, and road rollers. Vehicles may include human-powered vehicles. The classifications of vehicles are not limited to the above-mentioned examples. For example, motor vehicles may include industrial vehicles that can run on roads. The same type of vehicle may belong to a plurality of classifications. Ships may include, for example, personal watercraft, boats, and tankers. Aircraft may include, for example, fixed-wing airplanes and rotary-wing airplanes.

Figure 2:
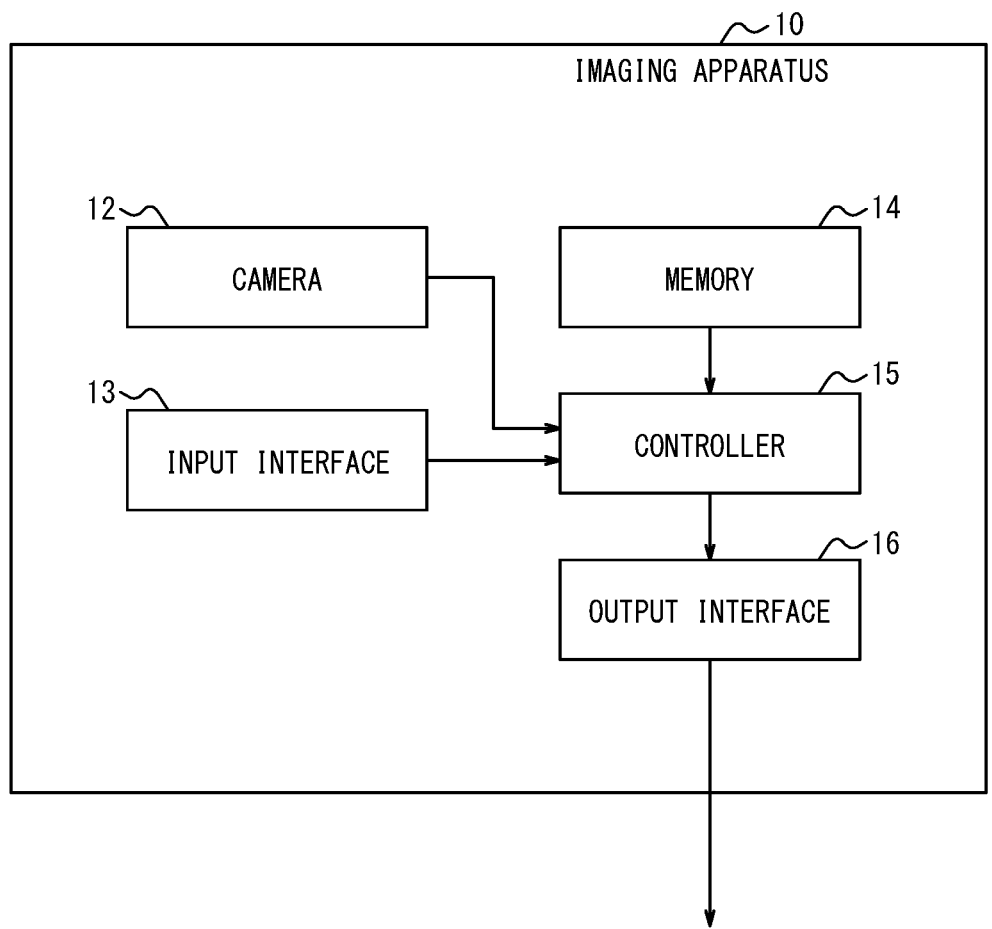
FIG. 2 is a functional block diagram illustrating a schematic structure of the imaging apparatus illustrated in FIG. 1.

As illustrated in FIG. 2, the imaging apparatus 10 includes a camera 12, an input interface 13, a memory 14, a controller 15, and an output interface 16.

The camera 12 includes an imaging optical system and an image sensor. The imaging optical system may be made up of one or more lenses. The image sensor is, for example, a complementary metal oxide semiconductor (CMOS) image sensor or a charge coupled device (CCD). The camera 12 generates a captured image CI, by the image sensor capturing a subject image incident on the imaging optical system.

Figure 3:
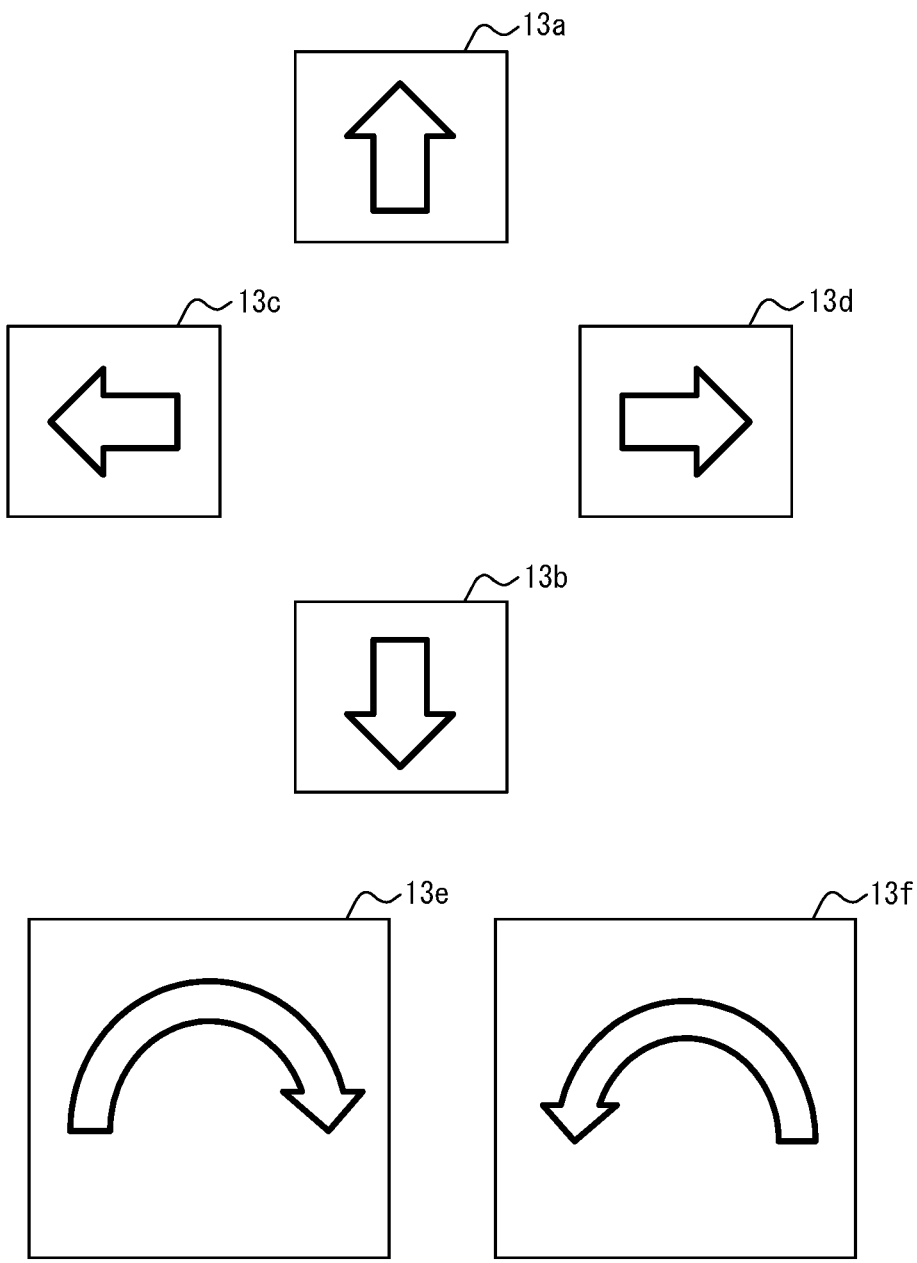
FIG. 3 is a diagram illustrating an example of operation buttons operated by a calibration operator in order to generate a control signal by an input interface illustrated in FIG. 2.

The input interface 13 generates a control signal for moving the below-described calibration object J in the captured image CI, based on operation of a calibration operator. As illustrated in FIG. 3, for example, the input interface 13 may include movement operation buttons including an up movement button 13a, a down movement button 13b, a left movement button 13c, and a right movement button 13d respectively marked with arrows indicating the upward direction, the downward direction, the leftward direction, and the rightward direction. The input interface 13 may further include rotation operation buttons including a right rotation movement button 13e and a left rotation movement button 13f respectively marked with arrows indicating the right rotation direction and the left rotation direction. When the calibration operator operates any of the movement operation buttons and the rotation operation buttons, the input interface 13 generates, based on the operation, a control signal indicating the direction and amount of movement of an output area OA in the captured image CI.

The input interface 13 may include a confirmation button for confirming the movement of the calibration object J. The input interface 13 generates a confirmation signal for confirming the movement of the output area OA in the captured image CI by the calibration operator.

The input interface 13 generates a switching signal for switching to any of the below-described functional modes, based on operation of the calibration operator. The input interface 13 may include an operation switch for selecting one of normal mode and calibration mode included in the functional modes. With such a structure, when the operation switch is switched to the normal mode by operation of the calibration operator, the input interface 13 generates a switching signal instructing switching to the normal mode. When the operation switch is switched to the calibration mode by operation of the calibration operator, the input interface 13 generates a switching signal instructing switching to the calibration mode.

The input interface 13 generates position information indicating the position of an image Im of any of the below-described indexes, based on operation of the calibration operator. Specifically, when the calibration operator performs operation for indicating the position of the image Im of any of the below-described indexes in the captured image CI using any pointing device, the input interface 13 generates a position signal based on the operation.

The input interface 13 is not limited to the operation buttons, the operation switch, and the pointing device, and may be implemented by the display apparatus 11 including a touch panel display.

The memory 14 stores programs and data. The memory 14 may include any storage device such as a semiconductor storage device or a magnetic storage device. The memory 14 may include a plurality of types of storage devices. The memory 14 may include a combination of a portable storage medium such as a memory card and a reader of the storage medium.

The memory 14 stores the direction of optical axis deviation and the amount of deviation inside the camera 12. The memory 14 stores target area information for defining an area of part of the captured image CI to be corrected in the below-described normal mode. The memory 14 stores correction information for correcting an image in the area of part of the captured image CI, as described later. The target area information and the correction information are generated in the below-described calibration mode executed by the controller 15.

The memory 14 stores object position information for defining the position of the calibration object J in the captured image CI. The calibration object J is a virtual image serving as an index in the captured image CI to perform a calibration process. The position in the captured image CI indicated by the object position information is a position in the captured image CI corresponding to a specific position with respect to the moveable body 20 in a state in which the imaging apparatus 10 is installed in the moveable body 20 so as to conform to design values.

The calibration object J is movable in the captured image CI. The calibration object J has any shape. For example, the calibration object J may comprise a shape of a rectangle, a line, a point, a symbol, or a combination thereof. The calibration object J has a plurality of corresponding portions including a first corresponding portion J1, a second corresponding portion J2, a third corresponding portion J3, and a fourth corresponding portion J4, which are each a part of the calibration object J. The plurality of corresponding portions may each be a characteristic part of the calibration object J. A characteristic part is a part that can be easily and uniquely identified visually by a user. Examples of the characteristic part include corners of a rectangle forming the calibration object J and ends and intersections of lines forming the calibration object J. For example, the calibration object J may have any number of corresponding portions, where the number is two or more. In this embodiment, the calibration object J has four corresponding portions.

The memory 14 stores output position information indicating the position of the output area OA which is a specific range with respect to the calibration object J. The output position information is information indicating a position relative to the calibration object J in the captured image CI. Thus, the output position information is also information indicating the position of the calibration object J that is at a specific position with respect to the output area OA.

The controller 15 includes one or more processors and memory. The controller 15 may include a general-purpose processor that performs a specific function by reading a specific program and a dedicated processor dedicated to a specific process. The dedicated processor may include an application specific integrated circuit (ASIC). Each processor may include a programmable logic device (PLD). The PLD may include a field-programmable gate array (FPGA). The controller 15 may be any of a system on a chip (SoC) and a system in a package (SiP) in which one or more processors cooperate with each other. The controller 15 will be described in detail later.

The output interface 16 outputs a partial image that is part of a captured image CI" obtained as a result of the below-described correction process by the controller 15, to the display apparatus 11.

The controller 15 executes control in any of the functional modes including the normal mode and the calibration mode. When the input interface 13 generates a switching signal instructing switching to the normal mode, the controller 15 executes control in the normal mode. When the input interface 13 generates a switching signal instructing switching to the calibration mode, the controller 15 executes control in the calibration mode.

After performing distortion correction in the calibration mode, the controller 15 performs the same distortion correction as the distortion correction in the calibration mode on an area of at least part of a captured image CI generated by the camera 12 in the normal mode. Specifically, in the normal mode, the controller 15 extracts the area of at least part of the captured image CI based on the target area information generated in the calibration mode and stored in the memory 14. The controller 15 corrects the extracted area of the part using the correction information stored in the memory 14. The target area information and the correction information will be described in detail later.

The controller 15 further performs image processing on the corrected image, and causes the output interface 16 to output the resultant image to the display apparatus 11. The controller 15 may superimpose a guide object on a partial image obtained by correcting the area of the part of the captured image CI using the correction information.

The guide object may be, for example, lines indicating a range in the captured image CI within which the moveable body 20 is expected to be located in the case where the moveable body 20 moves with the steering wheel of the moveable body 20 being in a predetermined state. For example, the guide object may include guide lines indicating the trajectory of both side surfaces of the moveable body 20 when the moveable body 20 moves. The guide object may include a guide line indicating a position that is a predetermined distance (for example, 2 meters to 5 meters) away from the rear end of the moveable body 20. The guide object is a virtual image displayed at a position in the captured image CI corresponding to a specific position in a real space that is based on the moveable body 20, and satisfies requirements as the calibration object J. In this embodiment, the guide object is also used as the calibration object J.

The controller 15 generates the target area information and the correction information in the calibration mode, as mentioned above.

Figure 4:
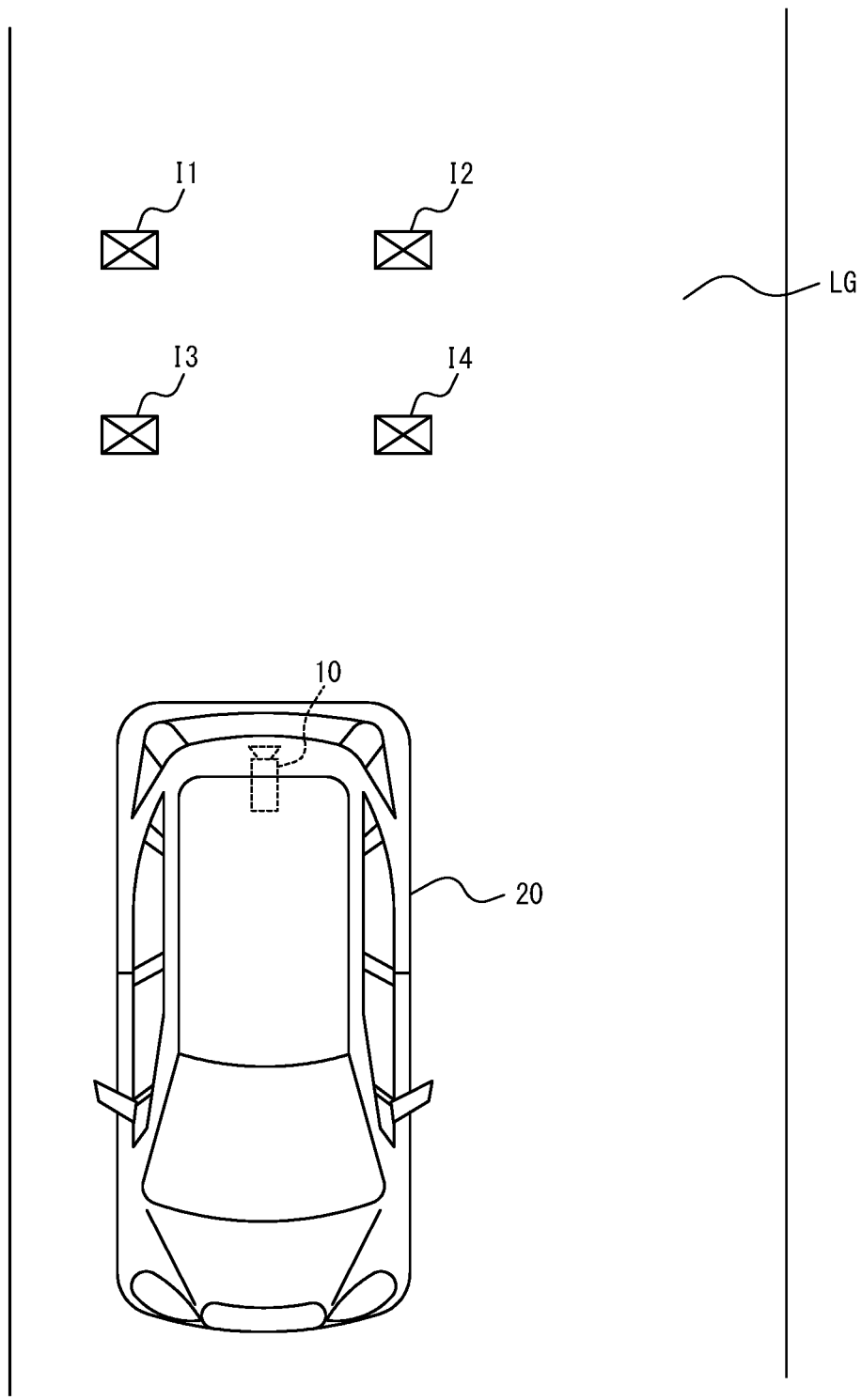
FIG. 4 is a schematic diagram of the moveable body and indexes illustrated in FIG. 1 as viewed from above.

Before the execution of the calibration mode, the operator arranges a plurality of indexes I including a first index I1, a second index I2, a third index I3, and a fourth index I4 at specific positions with respect to the moveable body 20, as illustrated in FIG. 4. The specific positions are positions in the real space corresponding to the positions of the corresponding portions of the calibration object J in the captured image CI in a state in which the imaging apparatus 10 is fixed to the moveable body 20 as designed. For example, the specific positions are behind the moveable body 20 and are on respective extension surfaces of both side surfaces of the moveable body 20. The specific positions are, for example, each a position at a predetermined distance (for example, 2 meters to 5 meters) away from the rear surface of the moveable body 20.

The arrangement of the indexes I may be performed by stopping the moveable body 20 on the level ground LG and placing the indexes I at positions determined with respect to the moveable body 20 on the level ground LG. The arrangement of the indexes I may be performed by stopping the moveable body 20 at a position determined with respect to the indexes I on the level ground LG on which the indexes I are drawn.

In the calibration mode, when a captured image CI is generated by the camera 12, the controller 15 superimposes the calibration object J at the position in the captured image CI indicated by the object position information stored in the memory 14. The controller 15 causes the output interface 16 to output, to the display apparatus 11, a partial image in the output area OA based on the output position information stored in the memory 14.

Figure 5:
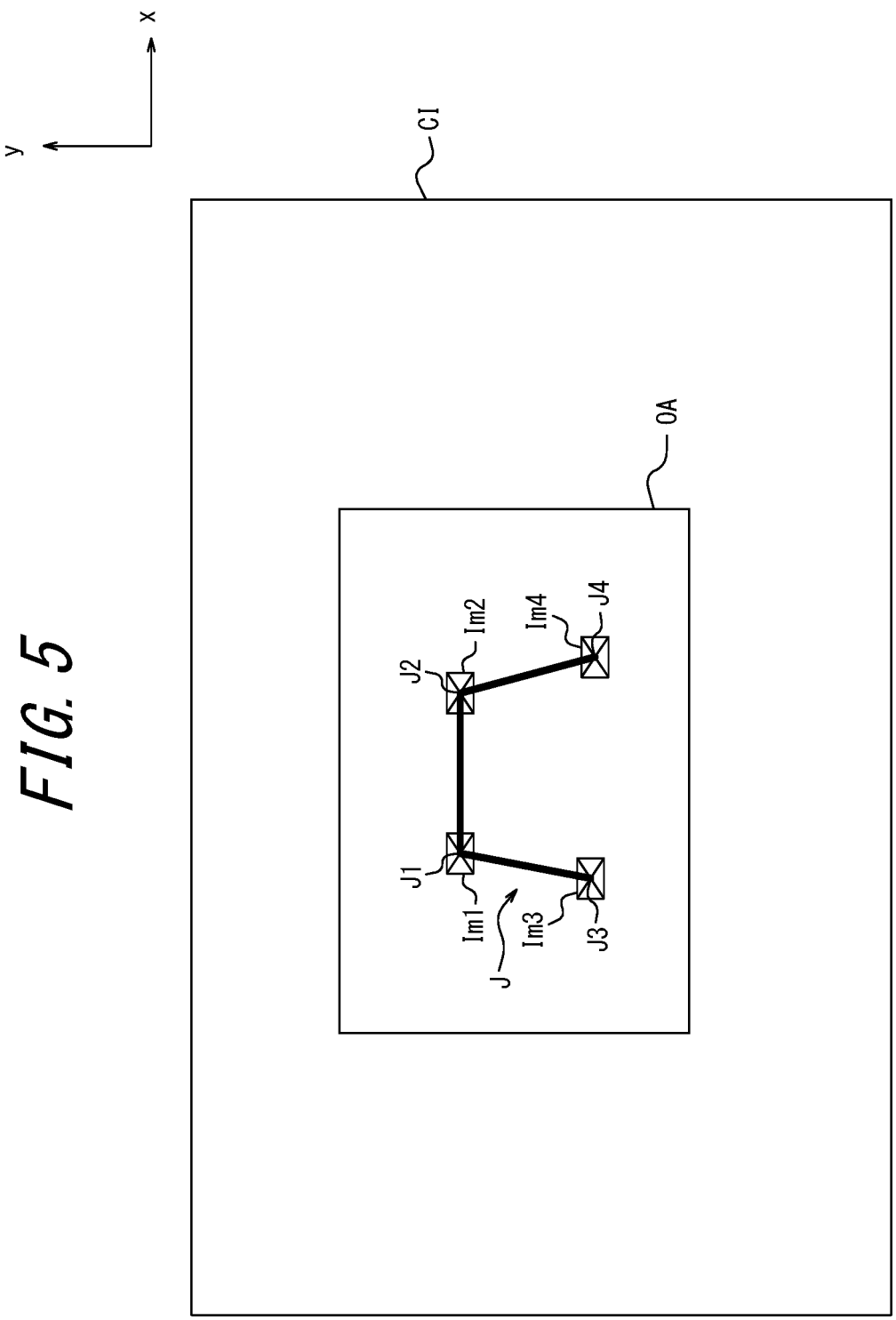
FIG. 5 is a schematic diagram illustrating an image captured in a state in which the installation position and posture of the imaging apparatus illustrated in FIG. 1 conform to design values.

When the calibration object J is superimposed on the captured image CI generated by the camera 12 in a state in which the imaging apparatus 10 is installed in the moveable body 20 so as to conform to the design values, the positions of the plurality of corresponding portions J in the calibration object J coincide with the images Im of the indexes, as illustrated in FIG. 5. Specifically, the first corresponding portion J1, the second corresponding portion J2, the third corresponding portion J3, and the fourth corresponding portion J4 of the calibration object J respectively coincide with an image Im1 of the first index, an image Im2 of the second index, an image Im3 of the third index, and an image Im4 of the fourth index.

In a state in which the position or posture of the imaging apparatus 10 with respect to the moveable body 20 does not conform to the design values, however, the image of the subject in the captured image CI is displaced or deformed from the image of the subject in a state in which the position and posture of the imaging apparatus 10 conform to the design values. For example, in a state in which the camera 12 deviates (i.e. is misaligned) in the horizontal direction, the image of the subject deviates in a direction in the captured image CI corresponding to the horizontal direction. In a state in which the camera 12 deviates in the vertical direction, the image of the subject deviates in a direction in the captured image CI corresponding to the vertical direction.

The direction of the optical axis OX of the camera 12 is inclined with respect to the level ground LG, as illustrated in FIG. 1. With such a structure, when the subject is farther from the camera 12 in direction Z in which a component of the optical axis OX in an in-plane direction of the level ground LG is directed, the image of the subject is smaller. Since the size of the image of the subject varies for each part depending on the distance from the camera 12, the image of the subject is distorted as a whole. Hence, when the index I is farther from the camera 12, the image of the index I deviates in direction x in the captured image CI. In the captured image CI illustrated in FIG. 5, direction y is a direction corresponding to direction Z in the real space illustrated in FIG. 1, and direction x is a direction orthogonal to direction y. In the example illustrated in FIG. 1, the first index I1 is farther from the camera 12 than the third index I3 in direction Z in the real space. Therefore, the image Im1 of the first index is located closer to the center side than the image Im3 of the third index in direction x in the captured image CI, as illustrated in FIG. 5. Likewise, the image Im2 of the second index is located closer to the center side than the image Im4 of the fourth index. In a state in which the posture of the camera 12 with respect to the moveable body 20 does not conform to the design values and is inclined in a tilt direction, the distance of the subject from the camera 12 changes, and consequently the degree of distortion changes. Hereafter, distortion of the image of the subject caused by inclination of the camera 12 in the tilt direction is referred to as "tilt distortion".

Figure 6:
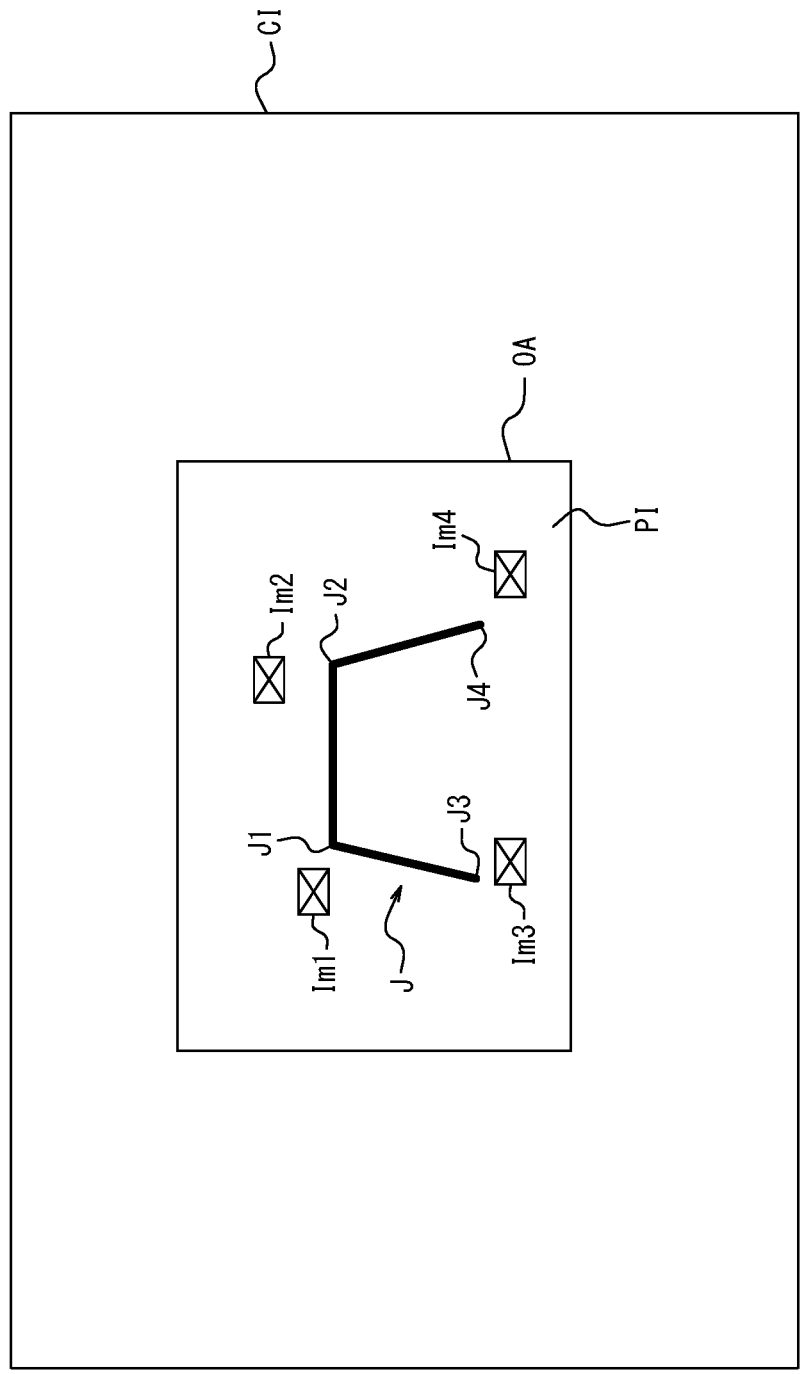
FIG. 6 is a schematic diagram illustrating an example of an image captured by the imaging apparatus illustrated in FIG. 1 and having a calibration object superimposed thereon.

Thus, in a state in which the position or posture of the imaging apparatus 10 with respect to the moveable body 20 does not conform to the design values, the position of the image Im of the index which is the image of the subject deviates from the position of the image Im of the index in a state in which the position and posture of the imaging apparatus 10 with respect to the moveable body 20 conform to the design values. Hence, the position of at least one of the plurality of corresponding portions J of the calibration object J does not coincide with the position of the image Im of the corresponding index. In the example illustrated in FIG. 6, the positions of the first corresponding portion J1, the second corresponding portion J2, the third corresponding portion J3, and the fourth corresponding portion J4 of the calibration object J do not coincide with the positions of the image Im1 of the first index, the image Im2 of the second index, the image Im3 of the third index, and the image Im4 of the fourth index, respectively.

To correct such deviation and distortion of the image of the subject in the captured image CI caused by deviation of the position or posture of the camera 12, the following processes are executed in the calibration mode.

First, in a first process, alignment of an image Im of an index corresponding to a single corresponding portion is performed. For example, in the first process, the calibration operator is instructed to operate the movement operation buttons depending on the direction and amount of movement of the output area OA so that the position of the first corresponding portion J1 coincides with the position of the image Im1 of the first index. In the following description, it is assumed that the calibration operator performs input to the input interface 13 so that the position of the first corresponding portion J1 coincides with the position of the image Im1 of the first index.

Figure 7:
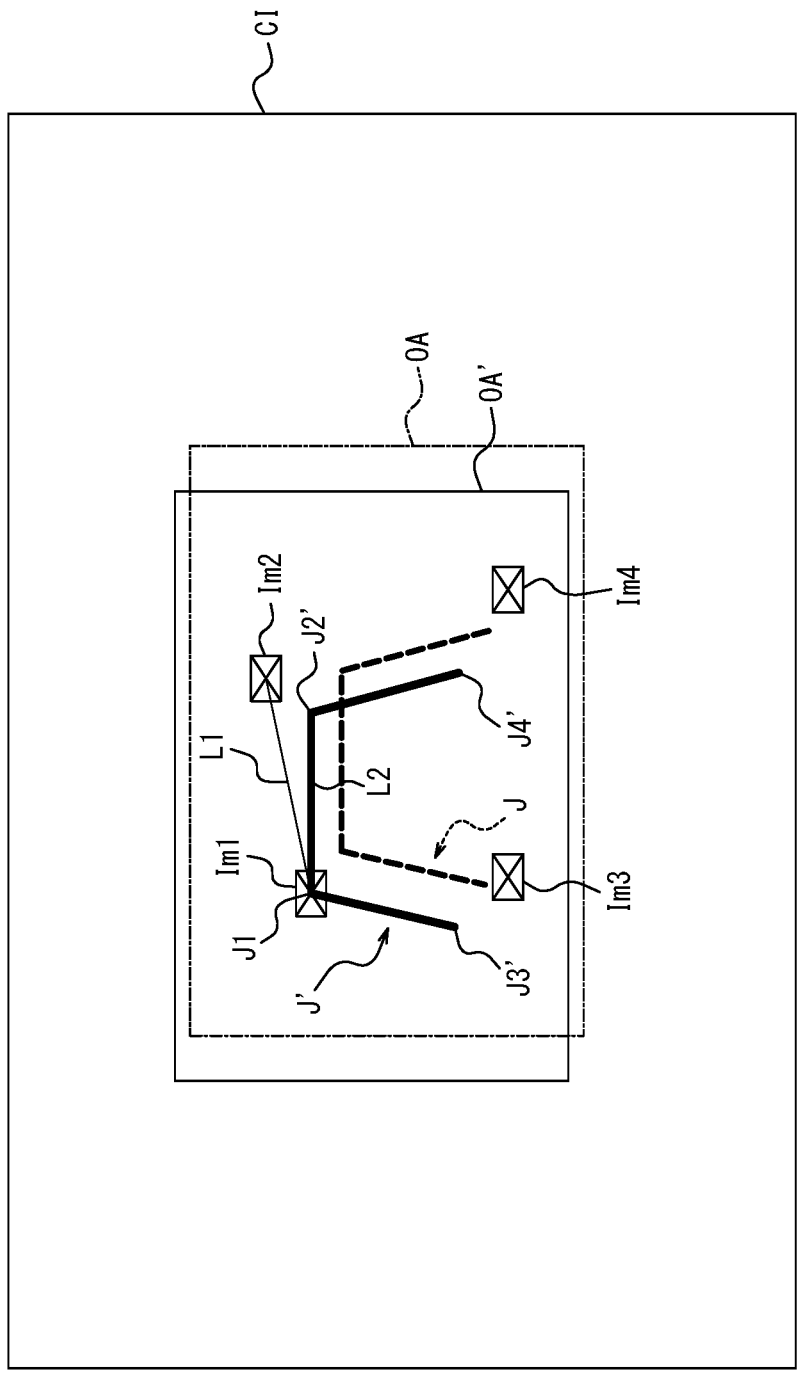
FIG. 7 is a schematic diagram illustrating a state in which the calibration object and an output area in the captured image illustrated in FIG. 6 are moved by translation.

Based on a control signal generated by the input interface 13 according to the operation of the calibration operator, the controller 15 moves the output area OA in the captured image CI by translation to move the calibration object J by translation. Specifically, based on the control signal, the controller 15 moves the output area OA by translation so that the first corresponding portion J1 coincides with the image Im1 of the first index, as illustrated in FIG. 7. Simultaneously, the controller 15 moves the calibration object J by translation so that the calibration object J is at a specific position with respect to the output area OA, based on output area information stored in the memory 14. As a result, a calibration object J' is superimposed on the captured image CI, and a partial image in an output area OA' is output.

The controller 15 causes the output interface 16 to output the partial image in the output area OA' to the display apparatus 11. When the input interface 13 generates a confirmation signal in the first process, the controller 15 determines that the first corresponding portion J1 coincides with the image Im1 of the first index, and ends the first process.

After the first process ends, a second process is executed in the case where another corresponding portion does not coincide with an index corresponding to the other corresponding portion. In the second process, in a state in which the corresponding portion and the image of the index aligned in the first process coincide with each other, alignment of one of the other corresponding portions and the image Im of the index corresponding to the other corresponding portion is performed. In the second process, the calibration operator is instructed to operate the rotation operation buttons depending on the direction and amount of rotation of the output area OA so that at least part of the first line segment L1 overlaps at least part of the second line segment L2.

The first line segment L1 is a line segment whose end points are the image Im1 of the first index and the image Im2 of the second index. The second line segment L2 is a line segment whose end points are the first corresponding portion J1 and a second corresponding portion J2'. In the following description, it is assumed that the calibration operator performs input to the input interface 13 so that at least part of the first line segment L1 overlaps at least part of the second line segment L2.

Figure 8:
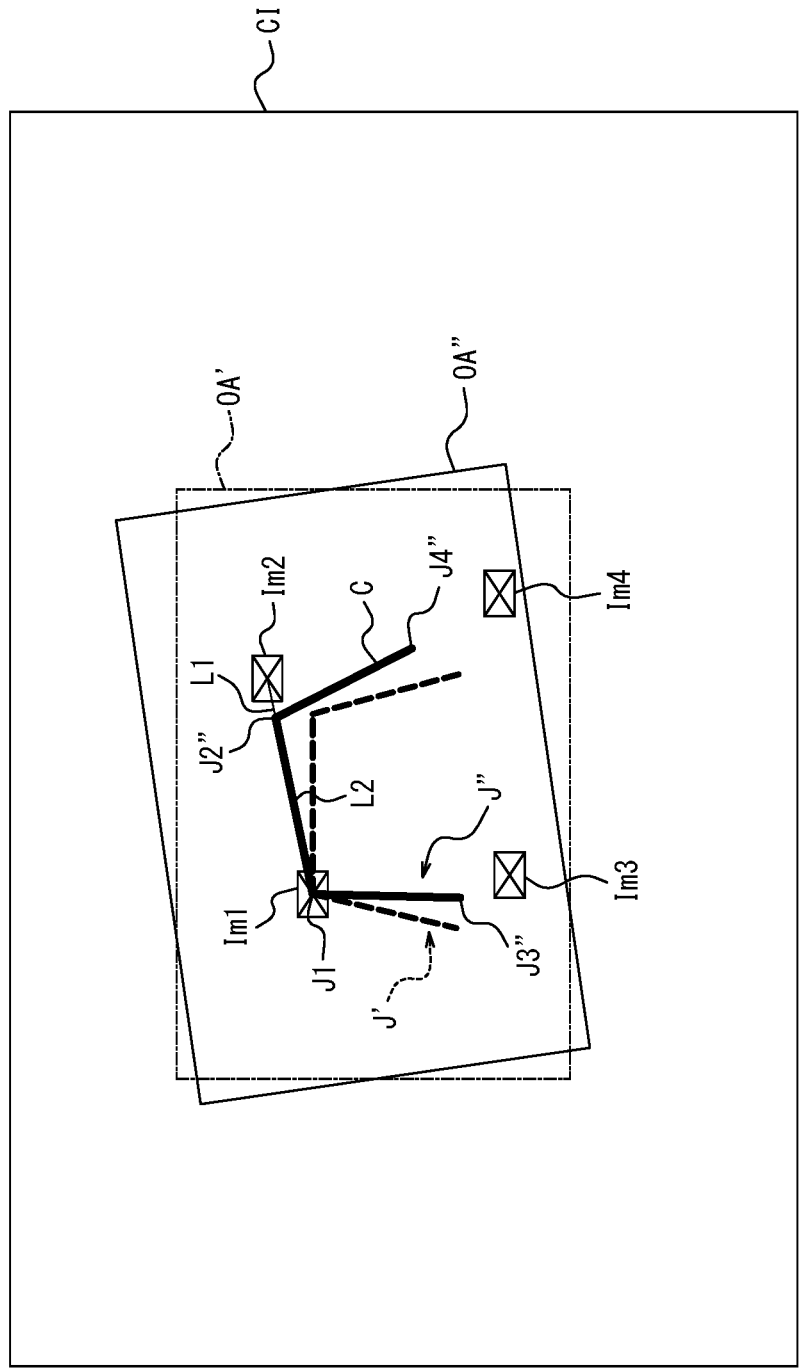
FIG. 8 is a schematic diagram illustrating a state in which the calibration object and the output area in the captured image illustrated in FIG. 7 are moved by rotation.

Based on a control signal generated by the input interface 13 according to the operation of the calibration operator, the controller 15 moves the output area OA' in the captured image CI by rotation to move the calibration object J' by rotation. Specifically, based on the control signal, the controller 15 moves the output area OA' by rotation so that at least part of the first line segment L1 overlaps at least part of the second line segment L2, as illustrated in FIG. 8. Simultaneously, the controller 15 moves the calibration object J' by rotation so that the calibration object J' is at a specific position with respect to the output area OA', based on the output area information stored in the memory 14. As a result, a calibration object J" is superimposed on the captured image CI, and a partial image in an output area OA" is output.

The controller 15 causes the output interface 16 to output the partial image in the output area OA" to the display apparatus 11. When the input interface 13 generates a confirmation signal in the second process, the controller 15 determines that at least part of the first line segment L1 overlaps at least part of the second line segment L2, and ends the second process.

After the second process ends, a third process is executed in the case where the whole first line segment L1 does not coincide with the whole second line segment L2. In the third process, the calibration operator is instructed to operate the pointing device to designate the position of the image Im2 of the second index. In the following description, it is assumed that the calibration operator performs input to the input interface 13 to designate the position of the image Im2 of the second index.

Based on a position signal generated by the input interface 13 according to the operation of the calibration operator and indicating the position of the image Im2 of the second index, the controller 15 determines whether the position of a second corresponding portion J2" coincides with the position of the image Im2 of the second index. In the case where the controller 15 determines that the second corresponding portion J2" does not coincide with the image Im2 of the second index, the controller 15 performs optical distortion correction on the captured image CI. Specifically, the controller 15 performs optical distortion correction for reducing optical distortion of the captured image CI by converting the captured image CI by a commonly known method using optical distortion data stored in the memory 14. After performing the optical distortion correction, the controller 15 ends the third process.

After the third process ends, a fourth process is executed.

In the fourth process, the controller 15 determines whether the second corresponding portion J2" coincides with the image Im2 of the second index. In the case where the controller 15 determines that the second corresponding portion J2" does not coincide with the image Im2 of the second index, the controller 15 performs the following tilt distortion correction (distortion correction) for reducing tilt distortion.

In the tilt distortion correction, the controller 15 expands and contracts the captured image CI in a first correction direction (predetermined direction) so that the second corresponding portion J2" coincides with the image Im2 of the second index. The first correction direction is a direction from the image Im2 of the second index to the image Im1 of the first index. The calibration object J has been moved by rotation and superimposed on the captured image CI as the calibration object J", as mentioned above. Accordingly, the first correction direction is also a direction from the image Im2 of the second index to the second corresponding portion J2".

While maintaining the position of the image Im1 of the first index, the controller 15 contracts a part of the captured image CI and expands another part of the captured image CI so that the image Im2 of the second index coincides with the second corresponding portion J2".

First, contraction of a part of the captured image CI and expansion of another part of the captured image CI in the case where the image Im2 of the second index is farther from the image Im1 of the first index than the second corresponding portion J2" will be described below.

The controller 15 contracts a part of the captured image CI on the side of the image Im2 of the second index with respect to the image Im1 of the first index in the first correction direction, toward the image Im1 of the first index in the first correction direction. The controller 15 also expands a part of the captured image CI on the side opposite to the image Im2 of the second index with respect to the image Im1 of the first index in the first correction direction, from the image Im1 of the first index in the first correction direction.

The expansion and contraction rate of each part of the captured image CI may be constant. The expansion and contraction rate of each part of the captured image CI may change depending on the distance from the position of the image Im1 of the first index in the first correction direction.

Figure 9:
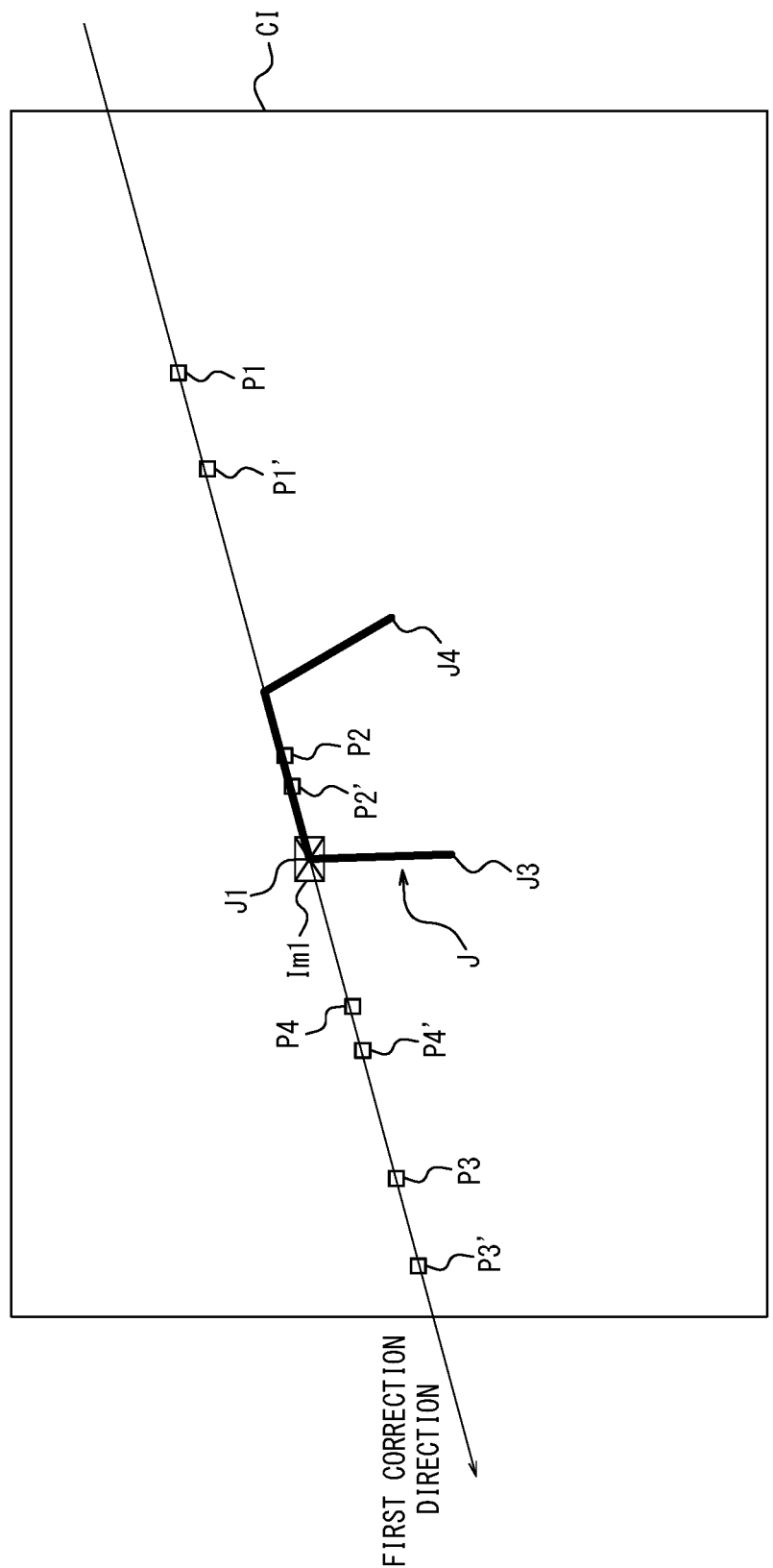
FIG. 9 is a schematic diagram for explaining expansion and contraction in a first correction direction.

In a structure in which the expansion and contraction rate changes, for example, the controller 15 contracts each part of the captured image CI on the side of the image Im2 of the second index with respect to the image Im1 of the first index in the first correction direction so that the part moves a greater distance toward the image Im1 of the first index when the part is farther from the image Im1 of the first index. The controller 15 expands each part of the captured image CI on the side opposite to the image Im2 of the second index with respect to the image Im1 of the first index in the first correction direction so that the part moves a greater distance away from the image Im1 of the first index when the part is farther from the image Im1 of the first index. In an example illustrated in FIG. 9, the controller 15 contracts a part P1 and a part P2 of the captured image CI on the side of the image Im2 of the second index with respect to the image Im1 of the first index in the first correction direction, respectively to a part P1' and a part P2'. The controller 15 contracts the part P1 located farther from the image Im1 of the first index so that the part P1 moves a greater distance toward the image Im1 of the first index than the part P2 located closer to the image Im1 of the first index. The controller 15 also expands a part P3 and a part P4 of the captured image CI on the side opposite to the image Im2 of the second index with respect to the image Im1 of the first index in the first correction direction, respectively to a part P3' and a part P4'. The controller 15 expands the part P3 located farther from the image Im1 of the first index so that the part P3 moves a greater distance away from the image Im1 of the first index than the part P4 located closer to the image Im1 of the first index.

Next, contraction of a part of the captured image CI and expansion of another part of the captured image CI in the case where the image Im2 of the second index is closer to the image Im1 of the first index than the second corresponding portion J2" will be described below.

The controller 15 expands a part of the captured image CI on the side of the image Im2 of the second index with respect to the image Im1 of the first index in the first correction direction, from the image of the first index in the first correction direction. The controller 15 also contracts a part of the captured image CI on the side opposite to the image Im2 of the second index with respect to the image Im1 of the first index in the first correction direction, toward the image Im1 of the first index in the first correction direction.

The expansion and contraction rate of each part of the captured image CI may be constant. The expansion and contraction rate of each part of the captured image CI may change depending on the distance from the position of the image Im1 of the first index in the first correction direction.

In a structure in which the expansion and contraction rate changes, for example, the controller 15 expands each part of the captured image CI on the side of the image Im2 of the second index with respect to the image Im1 of the first index in the first correction direction so that the part moves a greater distance away from the image Im1 of the first index when the part is farther from the image Im1 of the first index. The controller 15 contracts each part of the captured image CI on the side opposite to the image Im2 of the second index with respect to the image Im1 of the first index in the first correction direction so that the part moves a greater distance toward the image Im1 of the first index when the part is farther from the image Im1 of the first index.

Figure 10:
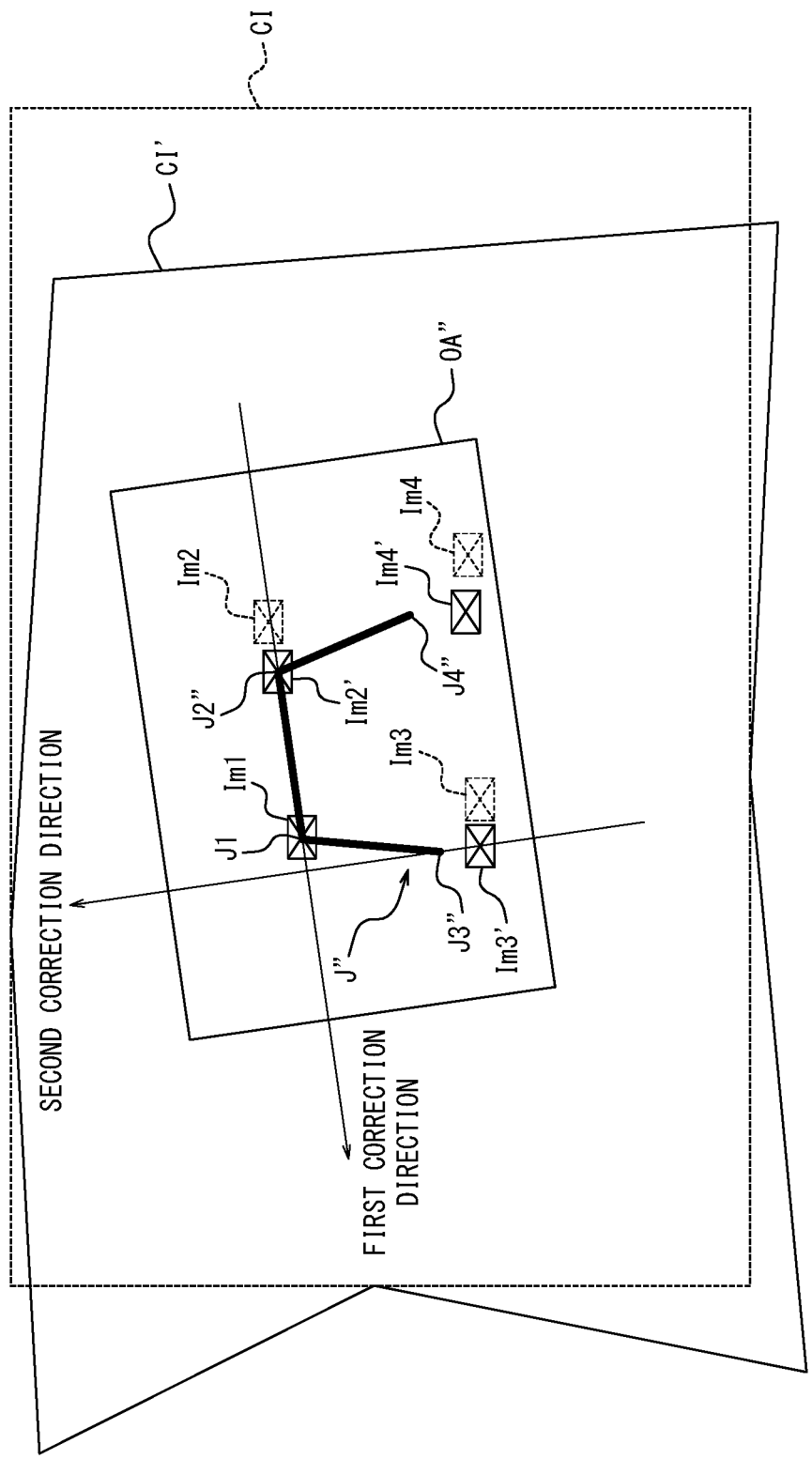
FIG. 10 is a schematic diagram illustrating a state in which the captured image subjected to optical distortion correction is expanded and contracted in the first correction direction.

Consequently, the whole captured image CI before the distortion correction in the first correction direction is deformed and corrected to a captured image CI', as illustrated in FIG. 10. The image Im2 of the second index before the distortion correction in the first correction direction is corrected to an image Im2' of the second index that coincides with the second corresponding portion J2". Likewise, the image Im3 of the third index and the image Im4 of the fourth index are respectively corrected to an image Im3' of the third index and an image Im4' of the fourth index. After performing the distortion correction in the first correction direction, the controller 15 ends the fourth process.

After the fourth process ends, a fifth process is executed in the case where any corresponding portion other than the two corresponding portions each made to coincide with the position of the image Im of the corresponding index in the first to third processes does not coincide with the image Im of the corresponding index. In the fifth process, the calibration operator is instructed to operate the pointing device to designate the position of the image Im3' of the third index. In the following description, it is assumed that the calibration operator performs input to the input interface 13 to designate the position of the image Im3' of the third index.

Based on a position signal generated by the input interface 13 according to the operation of the calibration operator and indicating the position of the image Im3' of the third index, the controller 15 determines whether the position of a third corresponding portion J3" coincides with the position of the image Im3' of the third index. In the case where the controller 15 determines that the third corresponding portion J3" does not coincide with the image Im3' of the third index, the controller 15 performs tilt distortion correction that, while maintaining the position of the image Im1 of the first index, expands and contracts the captured image CI' in a second correction direction so that the image Im3' of the third index coincides with the third corresponding portion J3". The second correction direction is a direction orthogonal to the first correction direction, and is a direction from the image Im3 of the third index to the third corresponding portion J3.

While maintaining the position of the image Im1 of the first index, the controller 15 contracts a part of the captured image CI' and expands another part of the captured image CI' in the second correction direction so that the image Im3' of the third index coincides with the third corresponding portion J3". Since the controller 15 expands and contracts the captured image CI' in the second correction direction while maintaining the position of the image Im1 of the first index, the position of the image Im2 of the second index located in the first correction direction perpendicular to the second correction direction with respect to the image Im1 of the first index is unchanged.

First, contraction of a part of the captured image CI' and expansion of another part of the captured image CI' in the case where the image Im3' of the third index is farther from the image Im1 of the first index than the third corresponding portion J3" will be described below. The controller 15 contracts a part of the captured image CI' on the side of the image Im3' of the third index with respect to the image Im1 of the first index in the second correction direction, toward the image Im1 of the first index in the second correction direction. The controller 15 also expands a part of the captured image CI' on the side opposite to the image Im3' of the third index with respect to the image Im1 of the first index in the second correction direction, from the image Im1 of the first index in the second correction direction The expansion and contraction rate of each part of the captured image CI' may be constant. The expansion and contraction rate of each part of the captured image CI' may change depending on the distance from the position of the image Im1 of the first index in the second correction direction.

In a structure in which the expansion and contraction rate changes, for example, the controller 15 contracts each part of the captured image CI' on the side of the image Im3' of the third index with respect to the image Im1 of the first index in the second correction direction so that the part moves a greater distance toward the image Im1 of the first index when the part is farther from the image Im1 of the first index. The controller 15 expands each part of the captured image CI' on the side opposite to the image Im3' of the third index with respect to the image Im1 of the first index in the second correction direction so that the part moves a greater distance away from the image Im1 of the first index when the part is farther from the image Im1 of the first index.

Next, contraction of a part of the captured image CI' and expansion of another part of the captured image CI' in the case where the image Im3' of the third index is closer to the image Im1 of the first index than the third corresponding portion J3" will be described below. The controller 15 expands a part of the captured image CI' on the side of the image Im3' of the third index with respect to the image Im1 of the first index in the second correction direction, from the image Im1 of the first index in the second correction direction. The controller 15 also contracts a part of the captured image CI' on the side opposite to the image Im3' of the third index with respect to the image Im1 of the first index in the second correction direction, toward the image Im1 of the first index in the second correction direction.

The expansion and contraction rate of each part of the captured image CI' may be constant. The expansion and contraction rate of each part of the captured image CI' may change depending on the distance from the position of the image Im1 of the first index in the second correction direction.

In a structure in which the expansion and contraction rate of each part changes, the controller 15 expands each part of the captured image CI' on the side of the image Im3' of the third index with respect to the image Im1 of the first index in the second correction direction so that the part moves a greater distance away from the first index when the part is farther from the image Im1 of the first index. The controller 15 contracts each part of the captured image CI' on the side opposite to the image Im3' of the third index with respect to the image Im1 of the first index in the second correction direction so that the part moves a greater distance toward the image Im1 of the first index when the part is farther from the image Im1 of the first index.

Figure 11:
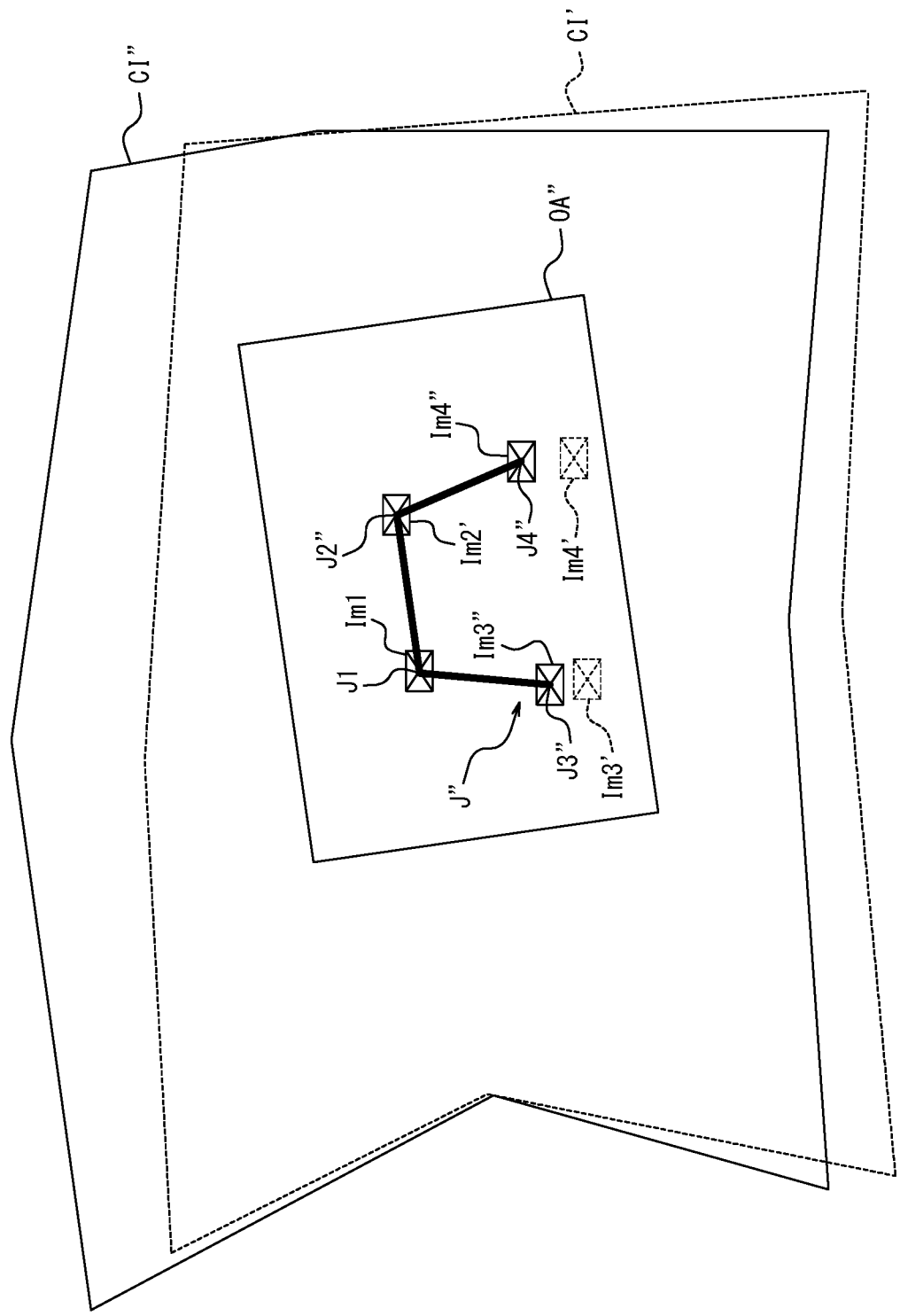
FIG. 11 is a schematic diagram illustrating a state in which the captured image illustrated in FIG. 10 is expanded and contracted in a second correction direction.

Consequently, the whole captured image CI' before the distortion correction in the second correction direction is deformed and corrected to a captured image CI", as illustrated in FIG. 11. The image Im3' of the third index before the distortion correction in the second correction direction is corrected to an image Im3" of the third index that coincides with the third corresponding portion J3". Likewise, the image Im4' of the fourth index is corrected to an image Im4" of the fourth index. After performing the distortion correction in the second correction direction, the controller 15 ends the fifth process.

After the fifth process ends, the controller 15 causes the output interface 16 to output, to the display apparatus 11, the calibration object J" and a partial image in the output area OA" based on the output position information stored in the memory 14.

In the case where the position of the image Im1 of the first index coincides with the position of the first corresponding portion J1 in the captured image CI before the execution of the first process, the first process may be omitted. In the case where the position of the second corresponding portion J2' coincides with the position of the image Im2 of the second index as a result of the execution of the first process, the second process and the third process may be omitted. In the case where the position of the second corresponding portion J2" coincides with the position of the image Im2 of the second index as a result of the execution of the second process, the third process may be omitted. In the case where the position of the third corresponding portion J3" coincides with the position of the image Im3' of the third index as a result of the execution of the fourth process, the fifth process may be omitted.

Figure 12:
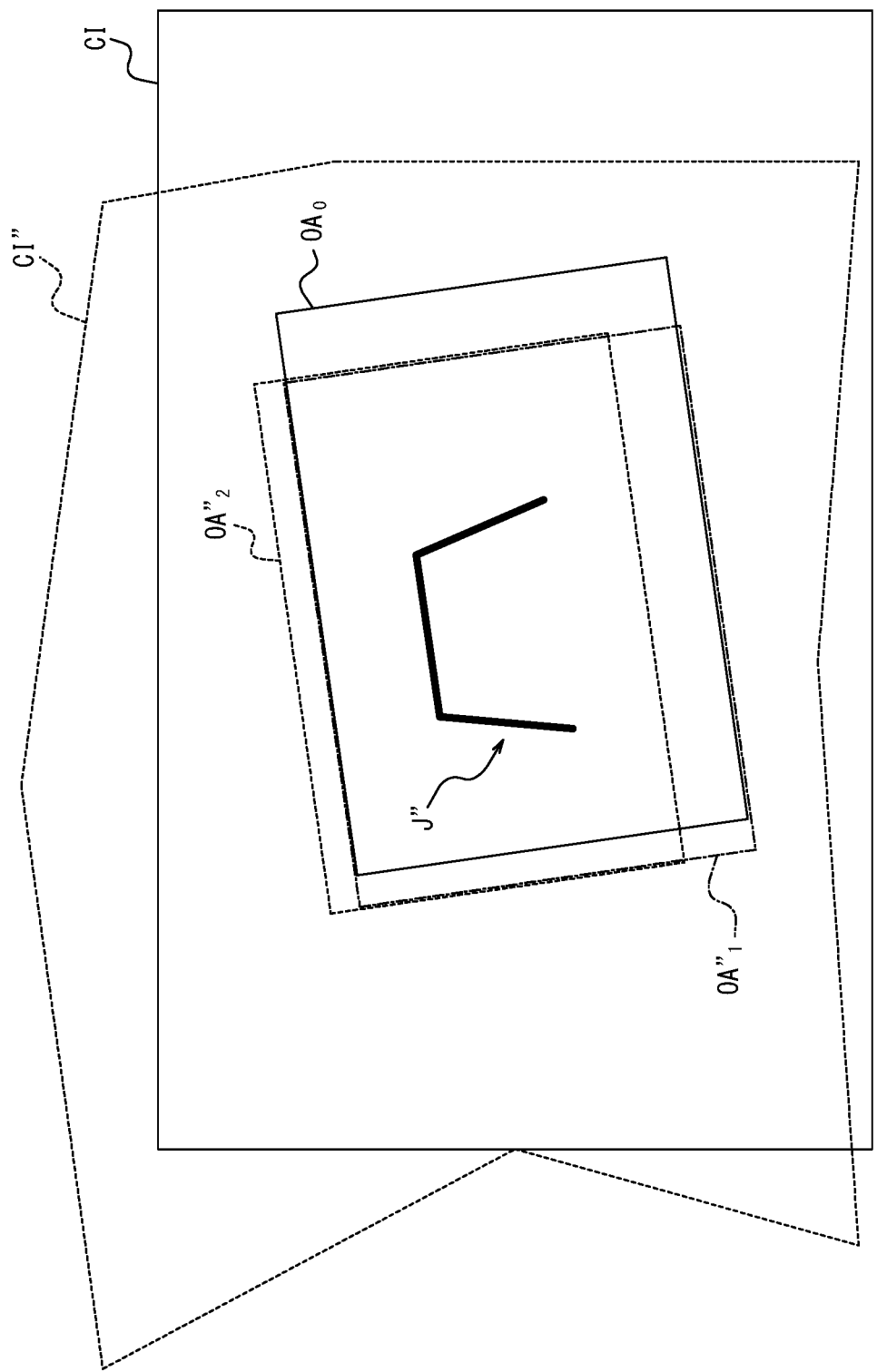
FIG. 12 is a diagram illustrating an area in the captured image before the correction corresponding to the output area in the captured image illustrated in FIG. 11.

After performing the foregoing movement of the calibration object J and distortion correction of the captured image CI, the controller 15 generates target area information and stores the target area information in the memory 14. The target area information indicates the position of a target area that is part of a captured image CI subjected to distortion correction in the normal mode. The target area is an output area $OA_0$ (see FIG. 12) in the captured image CI before the distortion correction corresponding to the output area OA" (see FIG. 11) in the captured image CI" after the distortion correction. An output area $OA"_1$ illustrated in FIG. 12 is a position in the captured image CI corresponding to the output area OA" in the captured image CI' after the tilt distortion correction in the first correction direction and before the tilt distortion correction in the second correction direction. An output area $OA"_2$ illustrated in FIG. 12 is a position in the captured image CI corresponding to the output area OA" in the captured image CI before the tilt distortion correction in the first correction direction and the second correction direction.

The output area OA" is determined based on the position of the calibration object J" in the captured image CI" after the end of the processes in the calibration mode, as mentioned above. In the calibration mode, the captured image CI is corrected to the captured image CI" based on the positions of the image Im1 of the first index, the image Im2 of the second index, and the image Im3 of the third index and the position of the calibration object J. Accordingly, the target area which is the output area $OA_0$ in the captured image CI before the correction is determined based on the positions of the image Im1 of the first index, the image Im2 of the second index, and the image Im3 of the third index and the position of the calibration object J in the captured image CI before the correction.

Moreover, after performing the foregoing correction process in the calibration mode, the controller 15 generates correction information and stores the correction information in the memory 14. The correction information is information indicating the correspondence between the position of each pixel in the correction target area which is the output area $OA_0$ in the captured image CI before the correction and the position of each pixel in the output area OA" in the captured image CI" after the correction. In the normal mode, the controller 15 corrects a captured image CI generated by the camera 12 using the correction information stored in the memory 14.

The controller 15 may store the correction information and the target area information in the memory 14 by writing them over the correction information and the target area information generated in the previous calibration mode. The controller 15 may store the correction information and the target area information in the memory 14 in addition to the correction information and the target area information generated in the previous calibration mode.

Figure 13:
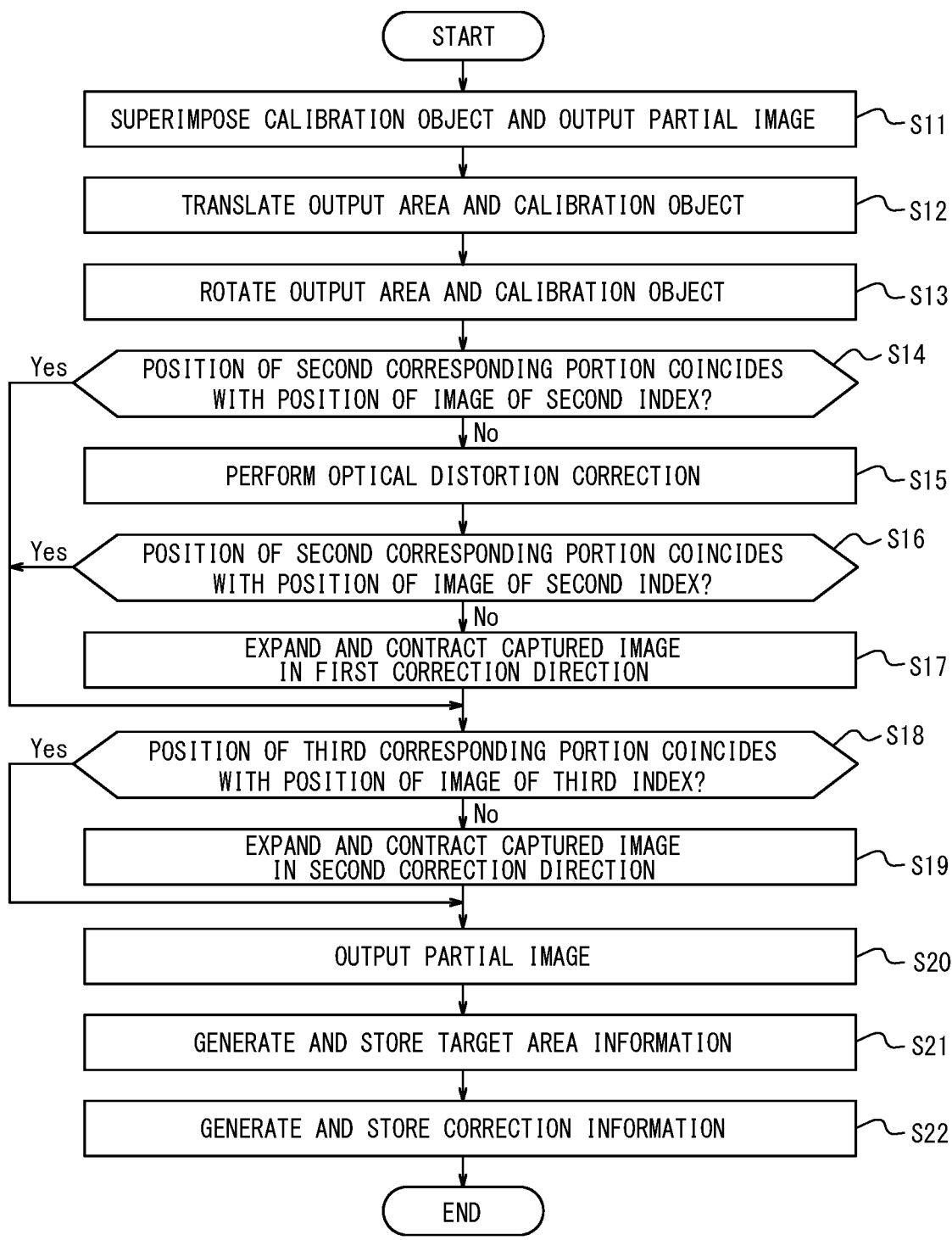
FIG. 13 is a flowchart illustrating a calibration process by the imaging apparatus illustrated in FIG. 2.

The calibration process executed in the calibration mode by the imaging apparatus 10 according to Embodiment 1 will be described below, with reference to FIG. 13. When a captured image CI is generated by the camera 12 after a switching signal instructing switching to the calibration mode is generated, the imaging apparatus 10 starts the calibration process.

In step S11, the controller 15 superimposes the calibration object J on the captured image CI, based on the object position information stored in the memory 14. The controller 15 also causes the output interface 16 to output, to the display apparatus 11, the superimposition position of the calibration object J and a partial image in the output area OA based on the output position information stored in the memory 14. After the controller 15 superimposes the calibration object J on the captured image CI and causes the output interface 16 to output the partial image, the process advances to step S12.

In step S12, the controller 15 moves the output area OA in the captured image CI to the output area OA' by translation, based on a control signal generated by the input interface 13. Simultaneously, the controller 15 moves the calibration object J to a specific position with respect to the output area OA', to superimpose the calibration object J' on the captured image CI. After the controller 15 moves the output area OA and the calibration object J by translation and the input interface 13 generates a confirmation signal, the process advances to step S13.

In step S13, the controller 15 moves the output area OA' in the captured image CI to the output area OA" by rotation, based on a control signal generated by the input interface 13. Simultaneously, the controller 15 moves the calibration object J' to a specific position with respect to the output area OA", to superimpose the calibration object J" on the captured image CI. After the controller 15 moves the output area OA' and the calibration object J' by rotation and the input interface 13 generates a confirmation signal, the process advances to step S14.

In step S14, the controller 15 determines whether the position of the second corresponding portion J2" coincides with the position of the image Im2 of the second index, based on a position signal generated by the input interface 13 and indicating the position of the image Im2 of the second index. In the case where the controller 15 determines that the position of the second corresponding portion J2" coincides with the position of the image Im2 of the second index, the process advances to step S18. In the case where the controller 15 determines that the position of the second corresponding portion J2" does not coincide with the position of the image Im2 of the second index, the process advances to step S15.

In step S15, the controller 15 performs optical distortion correction on the captured image CI. After the controller 15 performs the optical distortion correction on the captured image CI, the process advances to step S16.

In step S16, the controller 15 determines whether the position of the second corresponding portion J2" coincides with the position of the image Im2 of the second index. In the case where the controller 15 determines that the position of the second corresponding portion J2" coincides with the position of the image Im2 of the second index, the process advances to step S18. In the case where the controller 15 determines that the position of the second corresponding portion J2" does not coincide with the position of the image Im2 of the second index, the process advances to step S17.

In step S17, the controller 15 expands and contracts the captured image CI in the first correction direction to correct the captured image CI to the captured image CI', based on a position signal generated by the input interface 13 and indicating the position of the image Im2 of the second index. After the controller 15 expands and contracts the captured image CI in the first correction direction to correct the captured image CI to the captured image CI', the process advances to step S18.

In step S18, the controller 15 determines whether the position of the third corresponding portion J3" coincides with the position of the image Im3' of the third index, based on a position signal generated by the input interface 13 and indicating the position of the image Im3' of the third index in the captured image CI'. In the case where the controller 15 determines that the position of the third corresponding portion J3" coincides with the position of the image Im3' of the third index, the process advances to step S20. In the case where the controller 15 determines that the position of the third corresponding portion J3" does not coincide with the position of the image Im3' of the third index, the process advances to step S19.

In step S19, the controller 15 expands and contracts the captured image CI' in the second correction direction to correct the captured image CI' to the captured image CI". After the controller 15 expands and contracts the captured image CI' in the second correction direction to correct the captured image CI' to the captured image CI", the process advances to step S20.

In step S20, the controller 15 causes the output interface 16 to output, to the display apparatus 11, a partial image in the output area OA" in the captured image CI" moved in step S13. After the controller 15 causes the output interface 16 to output the partial image, the process advances to step S21.

In step S21, the controller 15 generates target area information based on the movement of the calibration object J and the distortion correction of the captured image CI performed in steps S12 to S19, and stores the target area information in the memory 14. After the controller 15 generates the target area information and stores it in the memory 14, the process advances to step S22.

In step S22, the controller 15 generates correction information based on the movement of the calibration object J and the distortion correction of the captured image CI performed in steps S12 to S19, and stores the correction information in the memory 14. After the controller 15 generates the correction information and stores it in the memory 14, the calibration process ends.

As described above, according to Embodiment 1, the imaging apparatus 10 moves the calibration object J so that the first corresponding portion J1 coincides with the image Im1 of the first index. The imaging apparatus 10 further performs distortion correction on the area of at least part of the captured image CI so that the image Im2 of the second index coincides with the second corresponding portion J2. Thus, the imaging apparatus 10 can reduce deviation and tilt distortion of the captured image CI caused by a change in the installation position or posture of the camera 12. That is, deviation of the captured image CI can be corrected with high accuracy. The imaging apparatus 10 can therefore maintain the relationship between the position of the image of the subject in the captured image CI in a state and the position of the subject in the real space. Hence, the imaging apparatus 10 can accurately estimate the position of the subject in the real space based on the image of the subject in the captured image CI.

Moreover, according to Embodiment 1, the imaging apparatus 10 expands and contracts the captured image CI in the first correction direction at the expansion and contraction rate depending on the position from the image Im1 of the first index in the predetermined direction in the captured image CI. In a structure in which the direction of the optical axis OX of the camera 12 is inclined with respect to the level ground LG, the degree of tilt distortion in the captured image CI differs depending on the position in the first correction direction. The first correction direction is the direction from the image Im2 of the second index to the image Im1 of the first index, as mentioned above. In a state in which the direction from the second index I2 to the first index I1 is a direction in the real space corresponding to the first correction direction, the imaging apparatus 10 can reduce tilt distortion by expanding and contracting the captured image CI in the first correction direction depending on the position in the first correction direction.

Moreover, according to Embodiment 1, the imaging apparatus 10 expands and contracts the captured image CI in the second correction direction at the expansion and contraction rate depending on the distance from the image Im1 of the first index in the second adjustment direction so that the third corresponding portion J3 coincides with the image Im3 of the third index. Thus, in the case where tilt distortion occurs in a direction different from the first correction direction, the imaging apparatus 10 can reduce the distortion.

Moreover, according to Embodiment 1, the imaging apparatus 10 performs the same distortion correction as the distortion correction performed in the calibration mode, on the area of at least part of a captured image CI generated by the camera 12 in the normal mode. Thus, the imaging apparatus 10 can perform appropriate distortion correction on the captured image CI generated after the completion of the calibration process, in order to reduce distortion caused by deviation of the installation position or posture of the imaging apparatus 10 with respect to the moveable body 20.

Moreover, according to Embodiment 1, the calibration object J is an object displayed when the moveable body 20 is operated, such as a guide object. The imaging apparatus 10 can use the object displayed when the moveable body 20 is operated, as the calibration object J. With such a structure, there is no need for an object used only for calibration, besides the object displayed when the moveable body 20 is operated. The imaging apparatus 10 does not need memory space for storing an object used only for calibration, and therefore can save storage capacity.

Moreover, according to Embodiment 1, the calibration object J is a guide object. The guide object is an object for aiding the driving of the moveable body 20, and accordingly is superimposed in an area near the center of an image displayed by the display apparatus 11. Hence, the imaging apparatus 10 corrects the captured image CI, using the calibration object J superimposed near the center of the captured image CI and the image Im of the index included near the center corresponding to the calibration object J. The imaging apparatus 10 can thus correct the captured image CI with higher accuracy than in the case of using the calibration object J and the image Im of the index near the edges of the captured image CI where distortion occurs frequently.

Moreover, according to Embodiment 1, after moving the calibration object J and the output area OA by translation, the imaging apparatus 10 moves the calibration object J by rotation and performs optical distortion correction. In the case where the image Im of the index is included near the center of the captured image CI, optical distortion does not occur much in an area including the image Im of the index. In such a state, there is a possibility that, after moving the calibration object J by rotation, the imaging apparatus 10 determines that the second corresponding portion J2 coincides with the image Im2 of the second index. In this case, the imaging apparatus 10 can omit the process of optical distortion correction and expansion and contraction in the first correction direction. This can reduce the processing load on the imaging apparatus 10.

Embodiment 2 of the present disclosure will be described below. Embodiment 2 differs from Embodiment 1 in the movement of the output area OA in the calibration mode. The following will mainly describe the differences of Embodiment 2 from Embodiment 1. Parts having the same structures as in Embodiment 1 are given the same reference signs.

Figure 14:
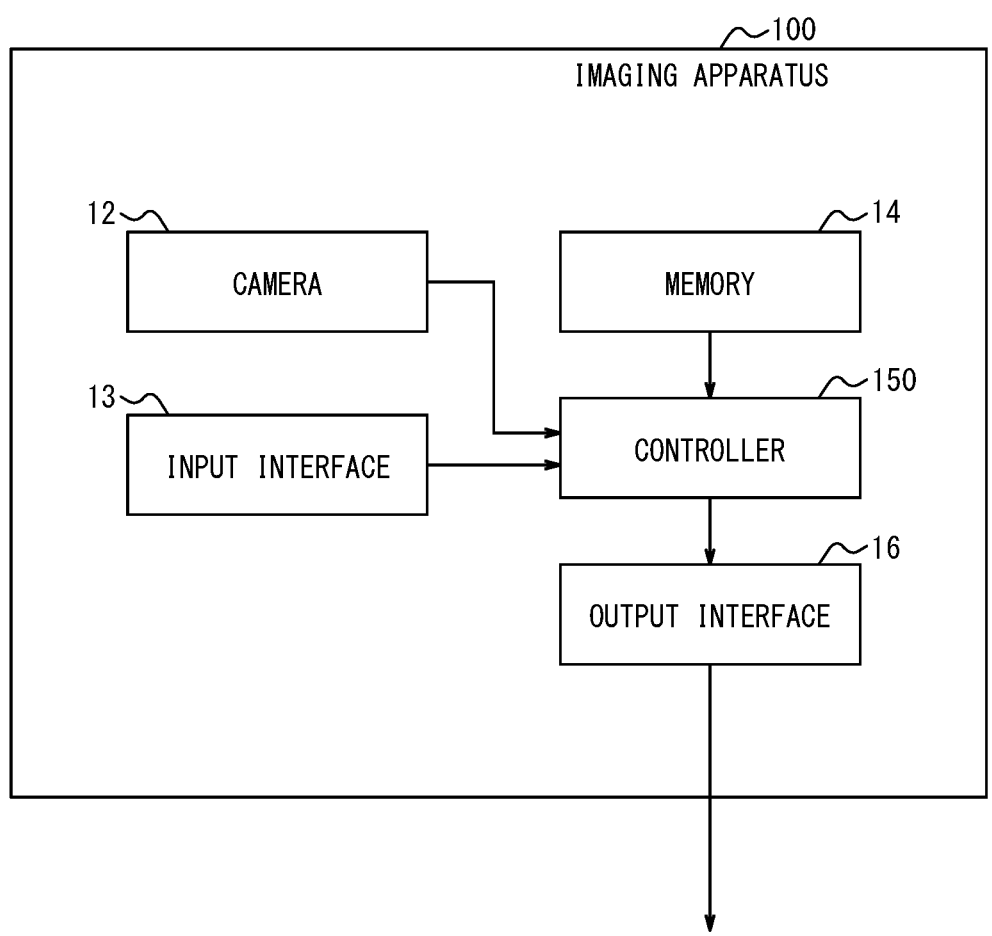
FIG. 14 is a functional block diagram illustrating a schematic structure of an imaging apparatus according to Embodiment 2.

An imaging apparatus 100 according to Embodiment 2 is installed in the moveable body 20, as in Embodiment 1. As illustrated in FIG. 14, the imaging apparatus 100 includes a camera 12, an input interface 13, a memory 14, a controller 150, and an output interface 16. The functions of the camera 12, the input interface 13, the memory 14, and the output interface 16 are the same as those in Embodiment 1.

The controller 150 executes control in any of the functional modes including the normal mode and the calibration mode. Control by the controller 150 in the normal mode is the same as that in Embodiment 1. The controller 150 does not move the output area OA with the movement of the calibration object in the calibration mode, unlike in Embodiment 1. Control by the controller 150 in the calibration mode will be described below.

Figure 15:
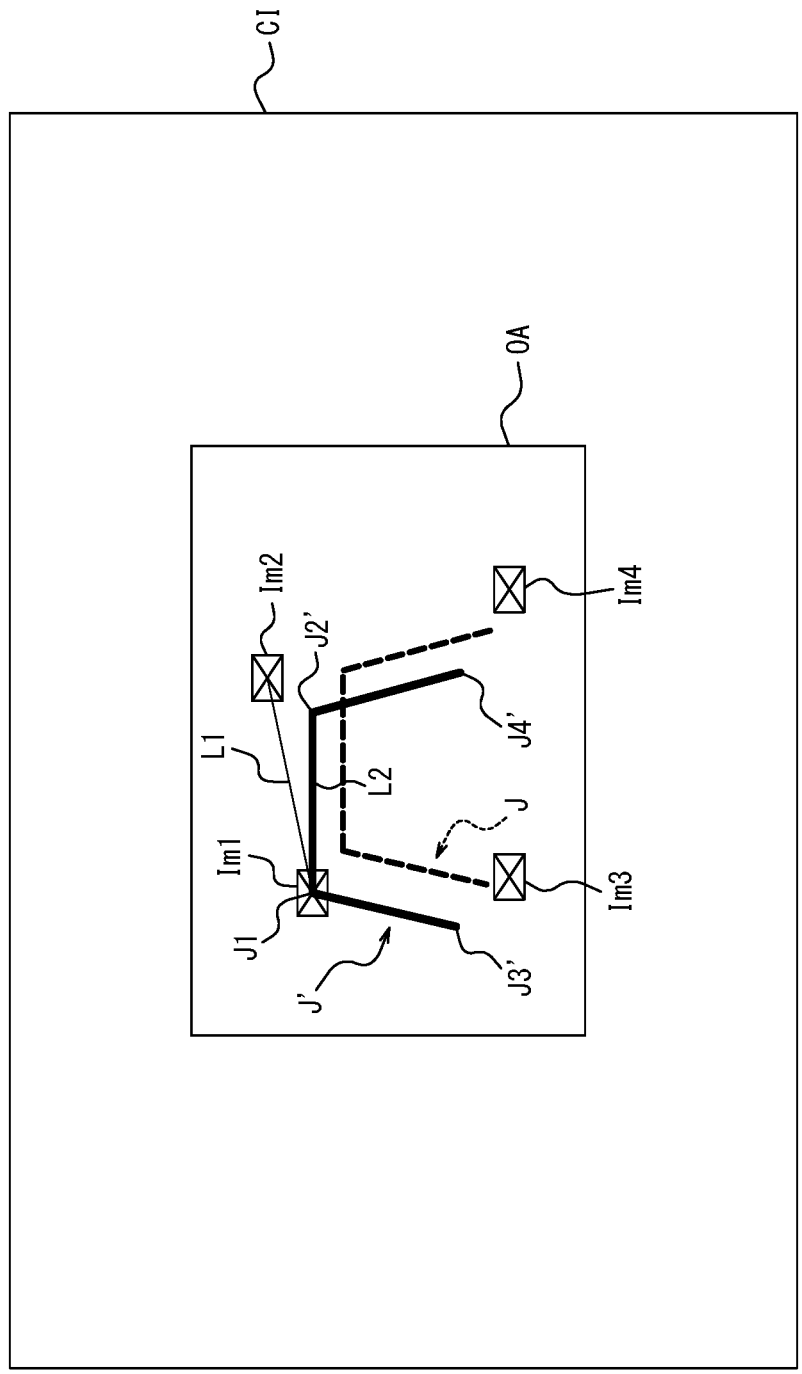
FIG. 15 is a schematic diagram illustrating a state in which the calibration object in the captured image illustrated in FIG. 6 is moved by translation.

In the first process, the controller 150 moves the calibration object J in the captured image CI by translation as illustrated in FIG. 15, as in Embodiment 1. As a result, the calibration object J' is superimposed on the captured image CI. The controller 150 does not translate the output area OA with the translation of the calibration object J, unlike in Embodiment 1. Accordingly, the controller 150 outputs a partial image in the output area OA in the captured image CI on which the translated calibration object J' is superimposed.

In the second process, the controller 150 moves the calibration object J' by rotation as illustrated in FIG. 16, as in Embodiment 1. As a result, the calibration object J" is superimposed on the captured image CI. The controller 150 does not rotate the output area OA with the rotation of the calibration object J', unlike in Embodiment 1. Accordingly, the controller 150 outputs a partial image in the output area OA in the captured image CI on which the rotated calibration object J" is superimposed.

In the third process, the controller 150 performs optical distortion correction on the captured image CI, as in Embodiment 1. In the fourth process and the fifth process, the controller 150 performs tilt distortion correction, as in Embodiment 1. As illustrated in FIG. 17, the positions of the whole area of the captured image CI and the image Im of each index after the distortion correction are the same as the positions after the distortion correction in Embodiment 1. On the other hand, since the output area OA is not moved in Embodiment 2, the position of the output area OA is the same as the position before the movement of the calibration object J in the captured image CI. Here, the controller 150 causes the output interface 16 to output, to the display apparatus 11, a partial image in the output area OA" as a result of moving the output area OA so as to be a predetermined specific range with respect to the calibration object J" based on the output position information stored in the memory 14.

The calibration process by the imaging apparatus 100 according to Embodiment 2 will be described below, with reference to FIG. 18. When a captured image CI is generated by the camera 12 after a switching signal instructing switching to the calibration mode is generated by the input interface 13, the imaging apparatus 100 starts the calibration process.

In step S31, the controller 150 superimposes the calibration object J on the captured image CI, based on the object position information stored in the memory 14. The controller 150 also causes the output interface 16 to output, to the display apparatus 11, a partial image in the output area OA that is the predetermined specific range with respect to the calibration object J. After the controller 150 causes the output interface 16 to output the partial image, the process advances to step S32.

In step S32, the controller 150 moves the calibration object J in the captured image CI by translation to superimpose the calibration object J' on the captured image CI, based on a control signal generated by the input interface 13. After the controller 150 moves the calibration object J by translation and the input interface 13 generates a confirmation signal, the process advances to step S33.

In step S33, the controller 150 moves the calibration object J' by rotation about the first corresponding portion J1 to superimpose the calibration object J" on the captured image CI, based on a control signal generated by the input interface 13. After the controller 150 moves the calibration object J' by rotation and the input interface 13 generates a confirmation signal, the process advances to step S34.

In step S34, the controller 150 determines whether the position of the second corresponding portion J2" coincides with the position of the image Im2 of the second index, based on a position signal generated by the input interface 13 and indicating the position of the image Im2 of the second index. In the case where the controller 150 determines that the position of the second corresponding portion J2" coincides with the position of the image Im2 of the second index, the process advances to step S38. In the case where the controller 150 determines that the position of the second corresponding portion J2" does not coincide with the position of the image Im2 of the second index, the process advances to step S35.

In step S35, the controller 150 performs optical distortion correction on the captured image CI. After the controller 150 performs the optical distortion correction on the captured image CI, the process advances to step S36.

In step S36, the controller 150 determines whether the position of the second corresponding portion J2" coincides with the position of the image Im2 of the second index. In the case where the controller 150 determines that the position of the second corresponding portion J2" coincides with the position of the image Im2 of the second index, the process advances to step S38. In the case where the controller 150 determines that the position of the second corresponding portion J2" does not coincide with the position of the image Im2 of the second index, the process advances to step S37.

In step S37, the controller 150 expands and contracts the captured image CI in the first correction direction to perform distortion correction. After the controller 150 expands and contracts the captured image CI in the first correction direction to correct the captured image CI to the captured image CI', the process advances to step S38.

In step S38, the controller 150 determines whether the position of the third corresponding portion J3" coincides with the position of the image Im3' of the third index, based on a position signal generated by the input interface 13 and indicating the position of the image Im3' of the third index in the captured image CI'. In the case where the controller 150 determines that the position of the third corresponding portion J3" coincides with the position of the image Im3' of the third index, the process advances to step S40. In the case where the controller 150 determines that the position of the third corresponding portion J3" does not coincide with the position of the image Im3' of the third index, the process advances to step S39.

In step S39, the controller 150 expands and contracts the captured image CI' in the second correction direction to correct the captured image CI' to the captured image CI". After the controller 150 expands and contracts the captured image CI' in the second correction direction to correct the captured image CI' to the captured image CI", the process advances to step S40.

In step S40, the controller 150 causes the output interface 16 to output, to the display apparatus 11, a partial image in the output area OA" as a result of moving the output area OA so as to be the specific range with respect to the calibration object J". After the controller 150 causes the output interface 16 to output the partial image, the process advances to step S41.

In step S41, the controller 150 generates target area information based on the movement of the calibration object J and the distortion correction of the captured image CI performed in steps S32 to S39, and stores the target area information in the memory 14. After the controller 150 generates the target area information and stores it in the memory 14, the process advances to step S42.

In step S42, the controller 150 generates correction information based on the movement of the calibration object J and the distortion correction of the captured image CI performed in steps S32 to S39, and stores the correction information in the memory 14. After the controller 150 generates the correction information and stores it in the memory 14, the calibration process ends.

As described above, according to Embodiment 2, the imaging apparatus 100 can reduce deviation of the captured image CI caused by a change in the installation position or posture of the camera 12 and reduce distortion of the captured image CI caused by the change, as in Embodiment 1.

Although the embodiments have been described above as representative examples, it should be obvious to those skilled in the art that many changes and substitutions may be made to the embodiments described above within the spirit and scope of the present disclosure. Therefore, the embodiments described above should not be construed as limiting the present disclosure, and various modifications and changes are possible without departing from the scope of the claims. For example, a plurality of structural blocks in any of the embodiments and examples may be combined into one structural block, and one structural block in any of the embodiments and examples may be divided into a plurality of structural blocks.

For example, although the controllers 15 and 150 perform optical distortion correction after moving the calibration object J by translation or rotation in the foregoing embodiments, the present disclosure is not limited to such. The controllers 15 and 150 may, for example, perform optical distortion correction on the captured image CI generated by the camera 12 and then move the calibration object J by translation or rotation.

REFERENCE SIGNS LIST 10, 100 imaging apparatus
11 display apparatus
12 camera
13 input interface
13a up movement button
13b down movement button
13c left movement button
13d right movement button
13e right rotation movement button
13f left rotation movement button
14 memory
15, 150 controller
16 output interface
20 moveable body

The invention claimed is:
1. An imaging apparatus comprising:
a camera configured to generate a captured image; and
a controller configured to superimpose a calibration object movable by translation or rotation in the captured image, and, in a case where a plurality of indexes located at positions determined with respect to a moveable body having the camera mounted therein are subjected to imaging, move the calibration object so that a first corresponding portion of the calibration object superimposed on the captured image coincides with an image of a first index of the plurality of indexes included in the captured image, and perform distortion correction on an area in the captured image determined based on a position of the image of the first index and a position of an image of a second index other than the first index in the captured image and a position at which the calibration object is superimposed on the captured image so that the image of the second index coincides with a second corresponding portion of the calibration object, wherein the distortion correction involves moving an output area in the captured image by rotation based on the second corresponding portion of the calibration object and the image of the second index and moving the calibration object by rotation about the first corresponding portion so that the calibration object is at a specific position with respect to the output area.

2. The imaging apparatus according to claim 1, wherein the distortion correction involves expanding and contracting the captured image in a predetermined direction such that the image of the second index coincides the second corresponding portion while maintaining the position of the image of the first index that coincides with the first corresponding portion of the calibration object.

3. A moveable body comprising
an imaging apparatus including:
a camera configured to generate a captured image; and
a controller configured to superimpose a calibration object movable by translation or rotation in the captured image, and, in a case where a plurality of indexes located at positions determined with respect to a moveable body having the camera mounted therein are subjected to imaging, move the calibration object so that a first corresponding portion of the calibration object superimposed on the captured image coincides with an image of a first index of the plurality of indexes included in the captured image, and perform distortion correction on an area in the captured image determined based on a position of the image of the first index and a position of an image of a second index other than the first index in the captured image and a position at which the calibration object is superimposed on the captured image so that the image of the second index coincides with a second corresponding portion of the calibration object, wherein the distortion correction involves moving the calibration object by rotation about the first corresponding portion which coincides with the image of the first index of the plurality of indexes included in the captured image based on the second corresponding portion of the calibration object and the image of the second index.

4. An imaging method executed by an imaging apparatus, the imaging method, wherein
the imaging apparatus
generates a captured image;
superimposes a calibration object movable by translation or rotation in the captured image; and
in a case where a plurality of indexes located at positions determined with respect to a moveable body having the imaging apparatus mounted therein are subjected to imaging, moves the calibration object so that a first corresponding portion of the calibration object superimposed on the captured image coincides with an image of a first index of the plurality of indexes included in the captured image, and performs distortion correction on an area in the captured image determined based on a position of the image of the first index and a position of an image of a second index other than the first index in the captured image and a position at which the calibration object is superimposed on the captured image so that the image of the second index coincides with a second corresponding portion of the calibration object, wherein the distortion correction involves moving the calibration object by rotation about the first corresponding portion which coincides with the image of the first index of the plurality of indexes included in the captured image so that at least part of a line connecting the image of the first index and the image of the second index overlaps at least part of a line connecting the first corresponding portion and the second corresponding portion.

5. An imaging apparatus comprising:
a camera configured to generate a captured image; and
a controller configured to superimpose a calibration object movable by translation or rotation in the captured image, and, in a case where a plurality of indexes located at positions determined with respect to a moveable body having the camera mounted therein are subjected to imaging, move the calibration object so that a first corresponding portion of the calibration object superimposed on the captured image coincides with an image of a first index of the plurality of indexes included in the captured image, and perform distortion correction on an area in the captured image determined based on a position of the image of the first index and a position of an image of a second index other than the first index in the captured image and a position at which the calibration object is superimposed on the captured image so that the image of the second index coincides with a second corresponding portion of the calibration object, wherein the distortion correction involves expanding and contracting the captured image in a predetermined direction such that the image of the second index coincides the second corresponding portion while maintaining the position of the image of the first index that coincides with the first corresponding portion of the calibration object.

* * * * *